US008108300B2

(12) United States Patent
Perg et al.

(10) Patent No.: US 8,108,300 B2
(45) Date of Patent: Jan. 31, 2012

(54) COMPUTER-SYSTEM CONTROL RELATED TO STANDARD APPLICATION IN USURY-FREE, SHARED-RISK FINANCING

(75) Inventors: Wayne F. Perg, Sierra Vista, AZ (US); Timothy Brian Gidley, Tower Lakes, IL (US); Anthony F Herbst, El Paso, TX (US)

(73) Assignee: Task Management, Inc., Riverside, IL (US)

( * ) Notice: Subject to any disclaimer, the term of this patent is extended or adjusted under 35 U.S.C. 154(b) by 507 days.

(21) Appl. No.: 11/294,152

(22) Filed: Dec. 5, 2005

(65) Prior Publication Data
US 2006/0190373 A1 Aug. 24, 2006

Related U.S. Application Data

(60) Provisional application No. 60/633,627, filed on Dec. 6, 2004.

(51) Int. Cl.
*G06Q 40/00* (2006.01)

(52) U.S. Cl. ......... 705/38; 705/35; 705/36 R; 705/36 T; 705/37; 705/39

(58) Field of Classification Search .............. 705/37, 705/38
See application file for complete search history.

(56) References Cited

U.S. PATENT DOCUMENTS

| | | | | |
|---|---|---|---|---|
| 5,812,987 A * | 9/1998 | Luskin et al. | ................ | 705/36 R |
| 6,052,673 A * | 4/2000 | Leon et al. | ....................... | 705/38 |
| 6,578,016 B1 * | 6/2003 | Trankina et al. | ................ | 705/39 |
| 6,985,880 B1 * | 1/2006 | Hodgdon et al. | ............ | 705/36 T |
| 7,149,712 B2 * | 12/2006 | Lang | ................................ | 705/35 |
| 7,295,987 B2 * | 11/2007 | Graff | ................................. | 705/1 |
| 7,516,099 B2 * | 4/2009 | Schneider | ........................ | 705/38 |
| 7,702,550 B2 * | 4/2010 | Perg et al. | ........................ | 705/35 |
| 2002/0077949 A1 * | 6/2002 | Qasem et al. | ................... | 705/36 |
| 2002/0156725 A1 * | 10/2002 | Harara | ............................ | 705/39 |
| 2003/0229555 A1 * | 12/2003 | Marlowe-Noren | ............. | 705/35 |
| 2003/0233324 A1 * | 12/2003 | Hammour et al. | ............. | 705/40 |
| 2004/0107152 A1 | 6/2004 | Marlowe-Noren | ............. | 705/35 |
| 2004/0148249 A1 * | 7/2004 | Kinnear | ........................... | 705/37 |
| 2004/0177029 A1 * | 9/2004 | Hammour et al. | ............. | 705/38 |
| 2004/0205020 A1 * | 10/2004 | Halawi | ............................ | 705/38 |
| 2004/0225589 A1 * | 11/2004 | Marlowe-Noren | ............. | 705/35 |
| 2004/0236654 A1 | 11/2004 | Marlowe-Noren | ............. | 705/35 |
| 2005/0075959 A1 * | 4/2005 | Woodruff et al. | ............... | 705/35 |
| 2005/0114151 A1 * | 5/2005 | Graff | ................................. | 705/1 |
| 2005/0222927 A1 * | 10/2005 | Woodley | ......................... | 705/35 |

(Continued)

OTHER PUBLICATIONS

Morris, V. & Shaykh Yusuf Talal DeLorenzo, Guide to Understanding Islamic Home Finance, Lightbulb Press.*

(Continued)

*Primary Examiner* — Gregory Johnson
(74) *Attorney, Agent, or Firm* — Patents and Licensing LLC; Daniel W. Juffernbruch

(57) ABSTRACT

A computer-aided system of illustrating, the system including: specifying, to a computer system, a private constant-dollar instrument, including defining a respective claim division on cash flow and an asset; entering data including actual cash flow datum and actual asset datum; calculating, with the computer system, respective values for each of the claims on the cash flow and asset; and, generating, with the computer system, an illustration of the private constant-dollar instrument funding a transaction.

36 Claims, 7 Drawing Sheets

U.S. PATENT DOCUMENTS

| | | | | |
|---|---|---|---|---|
| 2006/0136231 | A1* | 6/2006 | Thomas | 705/1 |
| 2006/0190373 | A1 | 8/2006 | Perg et al. | 705/35 |
| 2006/0208061 | A1 | 9/2006 | Carragher | 235/379 |
| 2007/0284438 | A1 | 12/2007 | Carragher | 235/380 |

OTHER PUBLICATIONS

Islamic Banks: A Novelty No Longer, Bloomberg Businessweek, Aug. 8, 2005, 2-pages.*

An Overview of Shariah-Compliant Funds, Qfinance, date=unknown, 3-pages.*

Shariah-compliant funds: A whole new world of investment, PriceWaterhouseCoopers, 2009, 14-pages.*

Islamic banking, wikipedia, 2-pages.*

Robert Fugard and Olga Petrovic, from Linklaters, "Think Islamic", Airfinance Journal. Coggeshall: Sep. 2004. p. 1-5.*

Richard De Belder, "Middle East: An overview of project finance and Islamic finance", International Financial Law Review. London: Jul. 1999. p. 1-6.*

Balasundram Maniam, "Perception of Islamic financial system: Its obstacles in application, and its marker", Academy of Accounting and Financial Studies Journal. Cullowhee: May 2000. vol. 4, Iss. 2; p. 1-8.*

The changing face of Islamic banking; De Belder, Richard T, Khan, Mansoor Hassan; International Financial Law Review. London; Nov. 1993. vol. 12, Iss. 11; 5-pages.*

Unlocking Islamic Finance, Part 1; Khalili, Sara; Infrastructure Finance; Apr. 1997; 4 pages.*

Notification Concerning Transmittal of International Preliminary Report on Patentability for PCT/US2005/044280, dated Mar. 26, 2009. pp. 1-5.

* cited by examiner

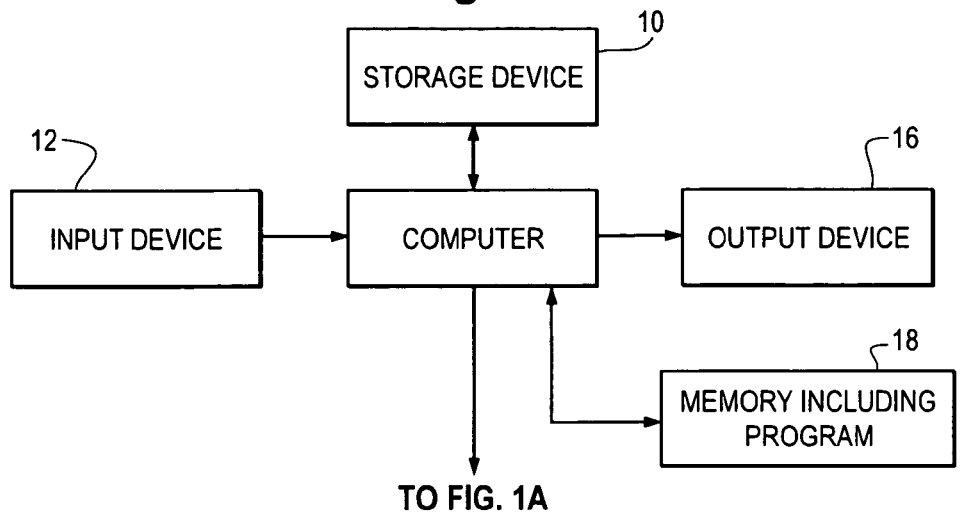
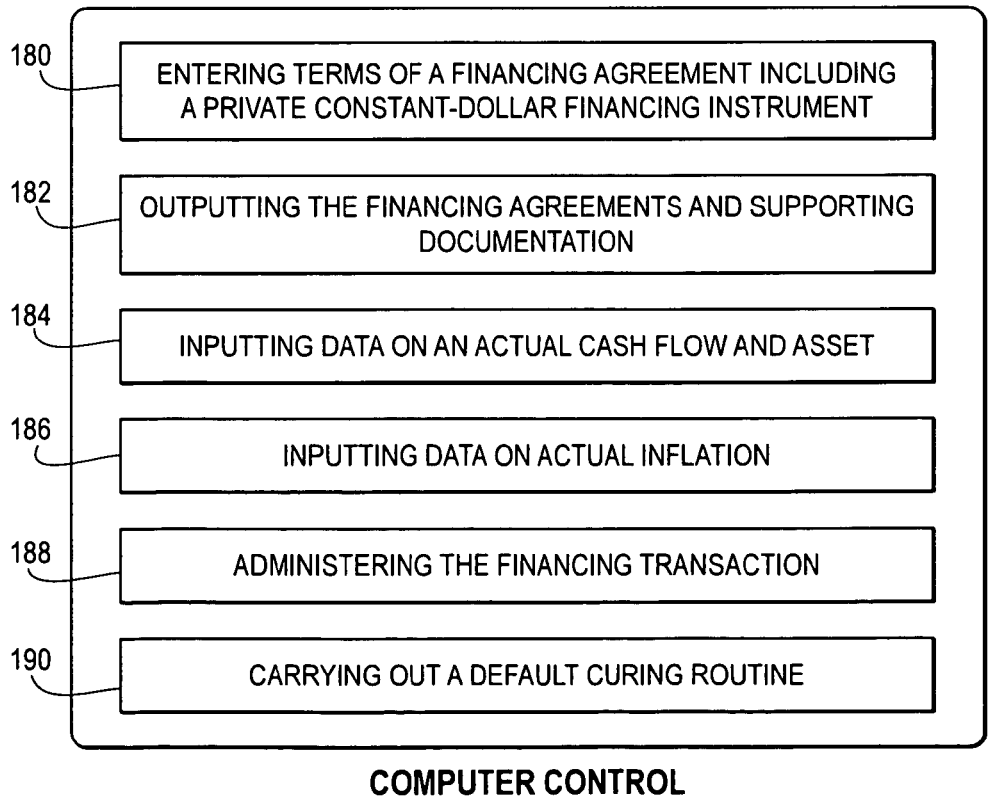

COMPUTER-SYSTEM CONTROL RELATED TO STANDARD APPLICATION IN USURY-FREE, SHARED-RISK FINANCING

I. PRIORITY DATA

The present patent application claims benefit from Ser. No. 60/633,627, filed by at least one of the inventors named herein on Dec. 6, 2004, which is hereby incorporated by reference.

II. TECHNICAL FIELD

The technical field is computers, computer-aided methods, and data processing systems, as illustrated more particularly herein. Exemplary embodiments include, depending on the implementation, apparatus, a method for funding, and corresponding products produced thereby, as well as data structures, computer-readable media tangibly embodying program instructions, computer-generated documentation, manufactures, and necessary intermediates of the foregoing.

III. BRIEF DESCRIPTION OF THE DRAWINGS

Figure 1A:
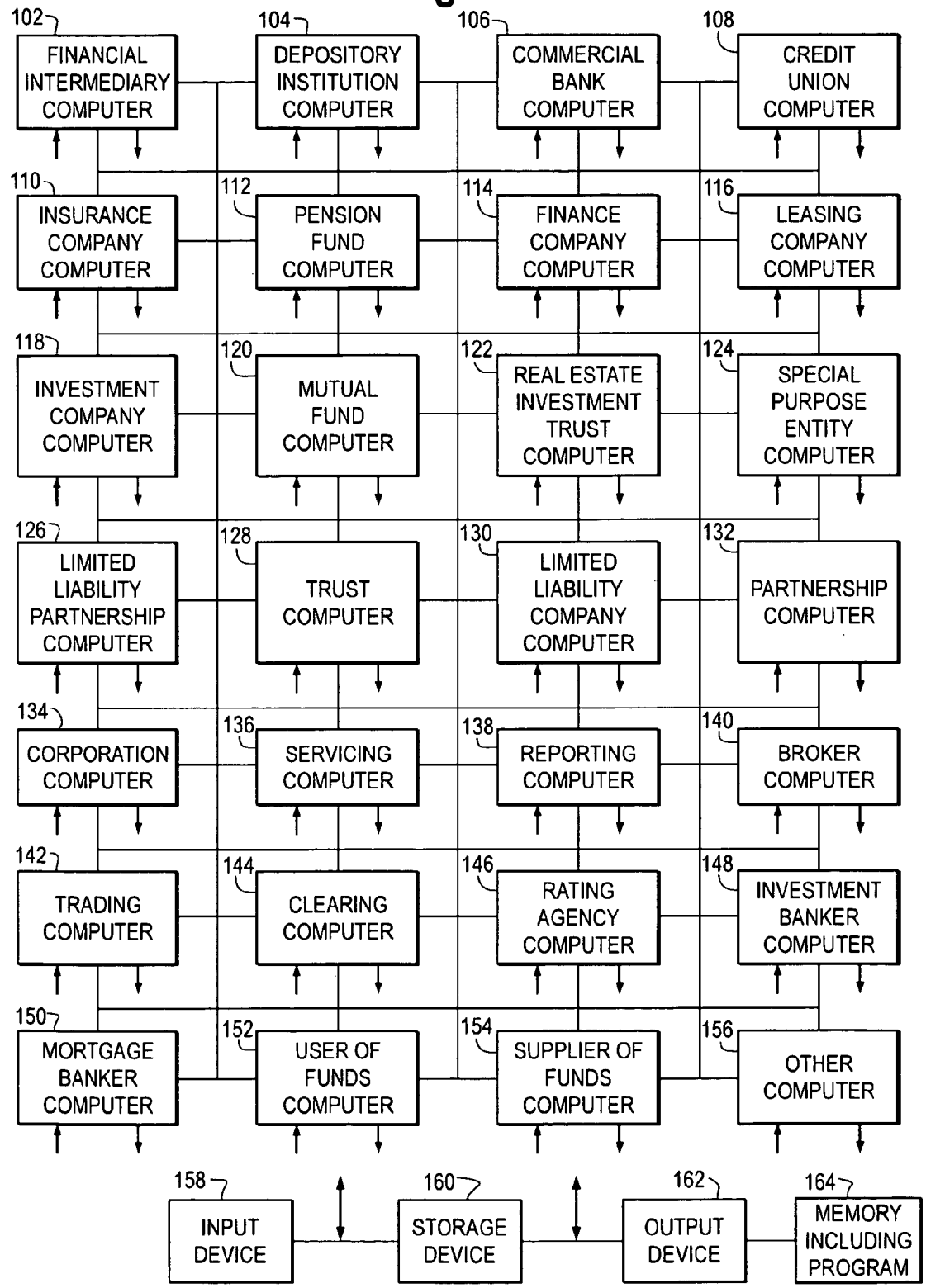
Figure 2:
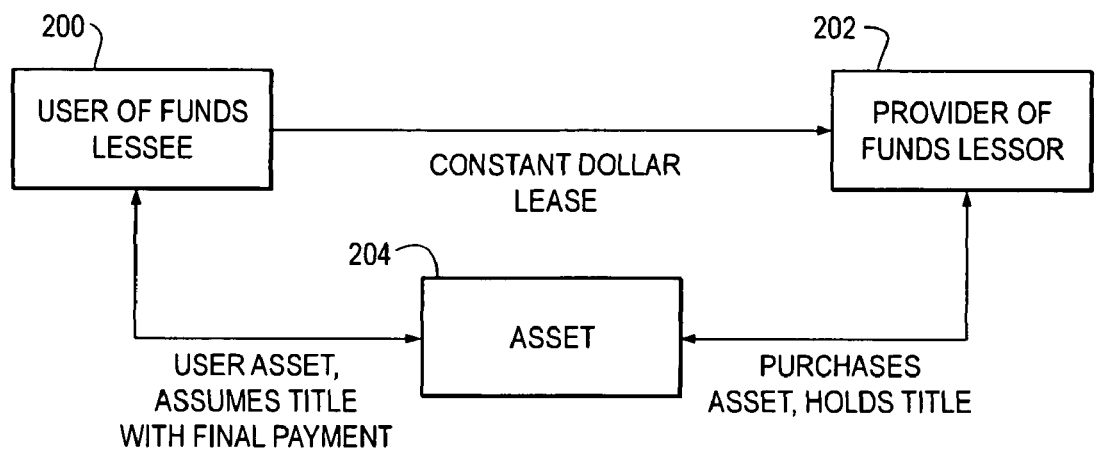
Figure 3:
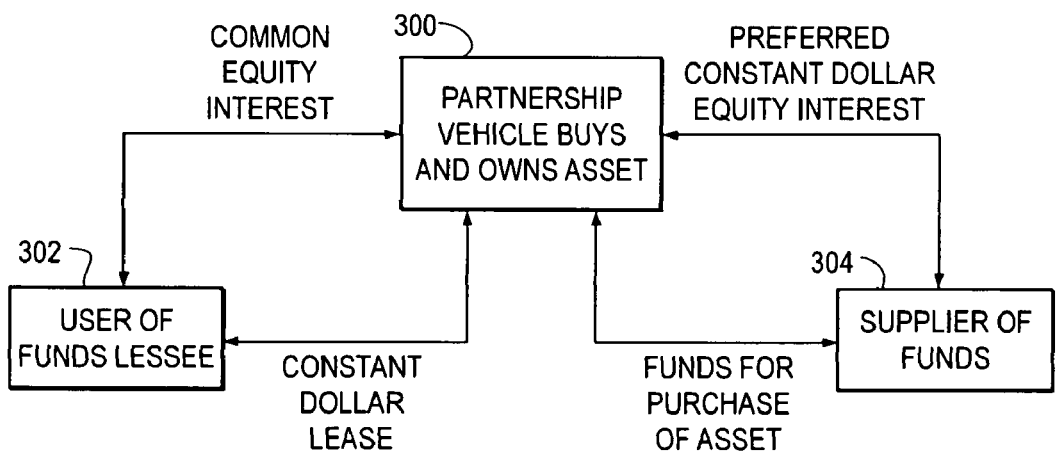
Figure 4:
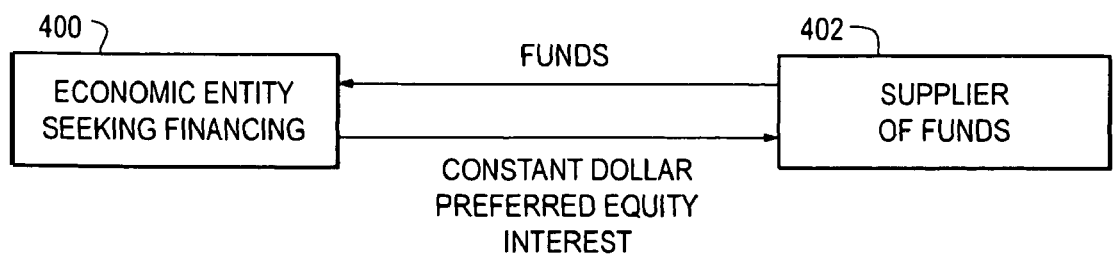
Figure 5:
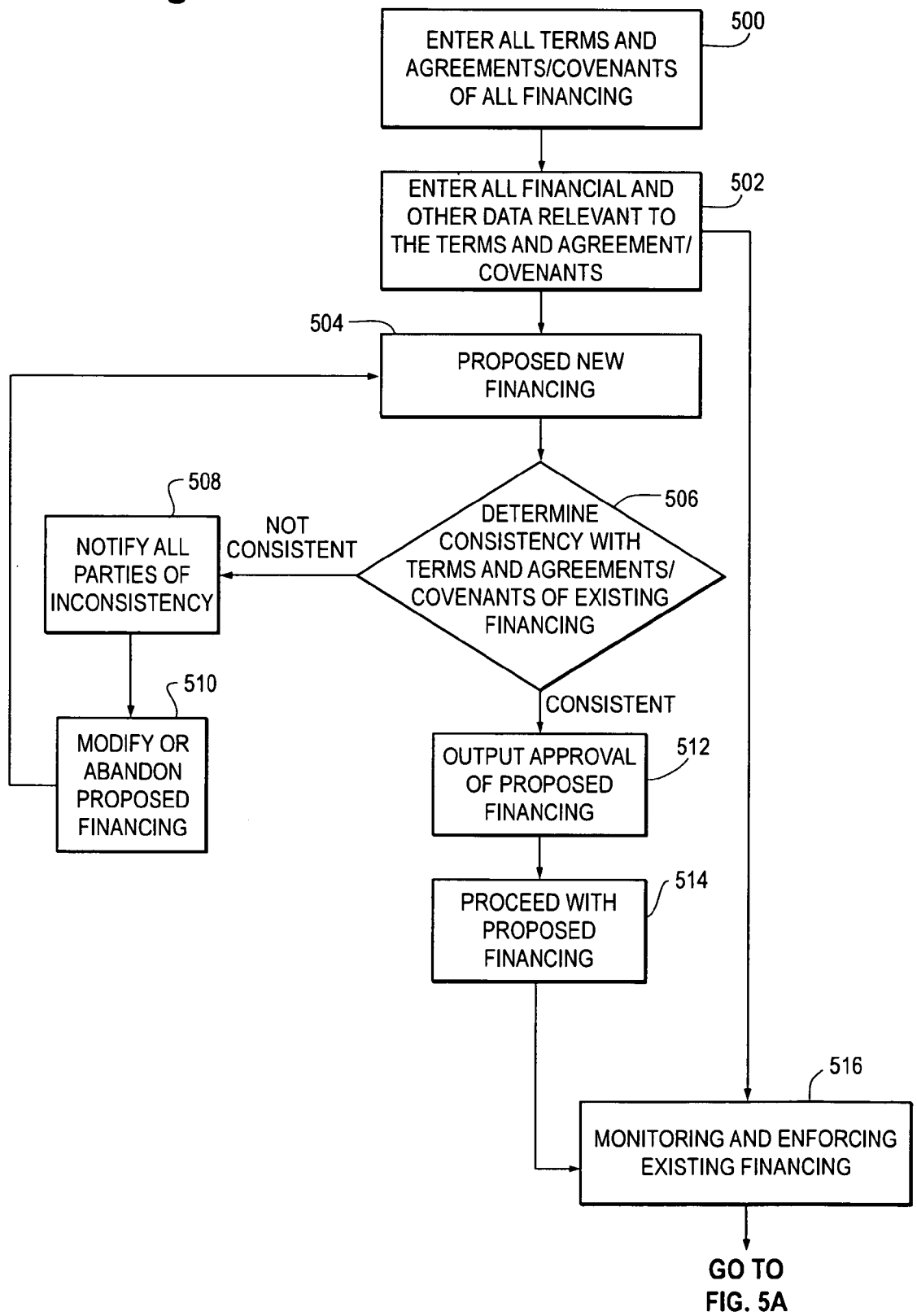
Figure 5A:
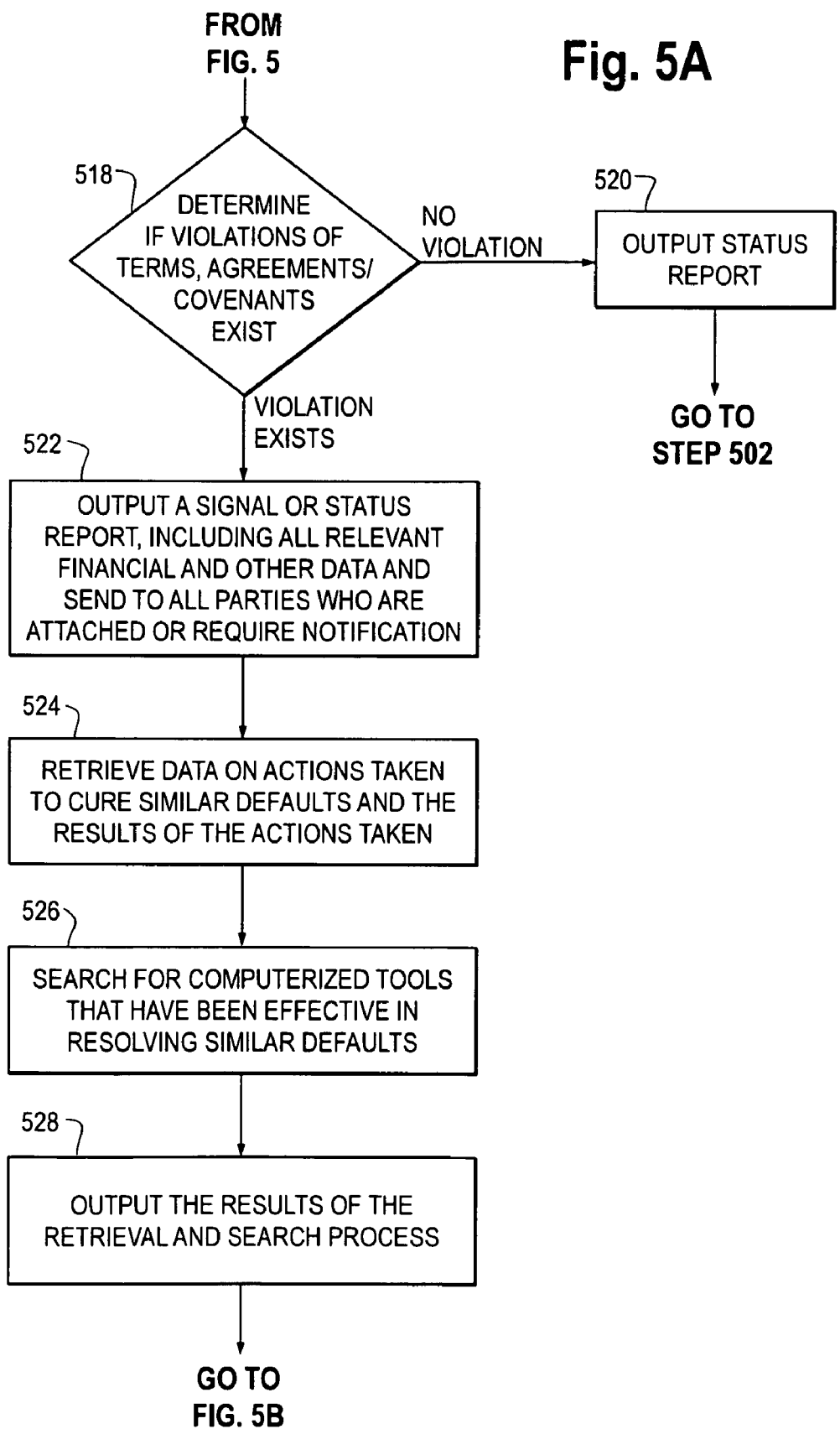
Figure 5B:
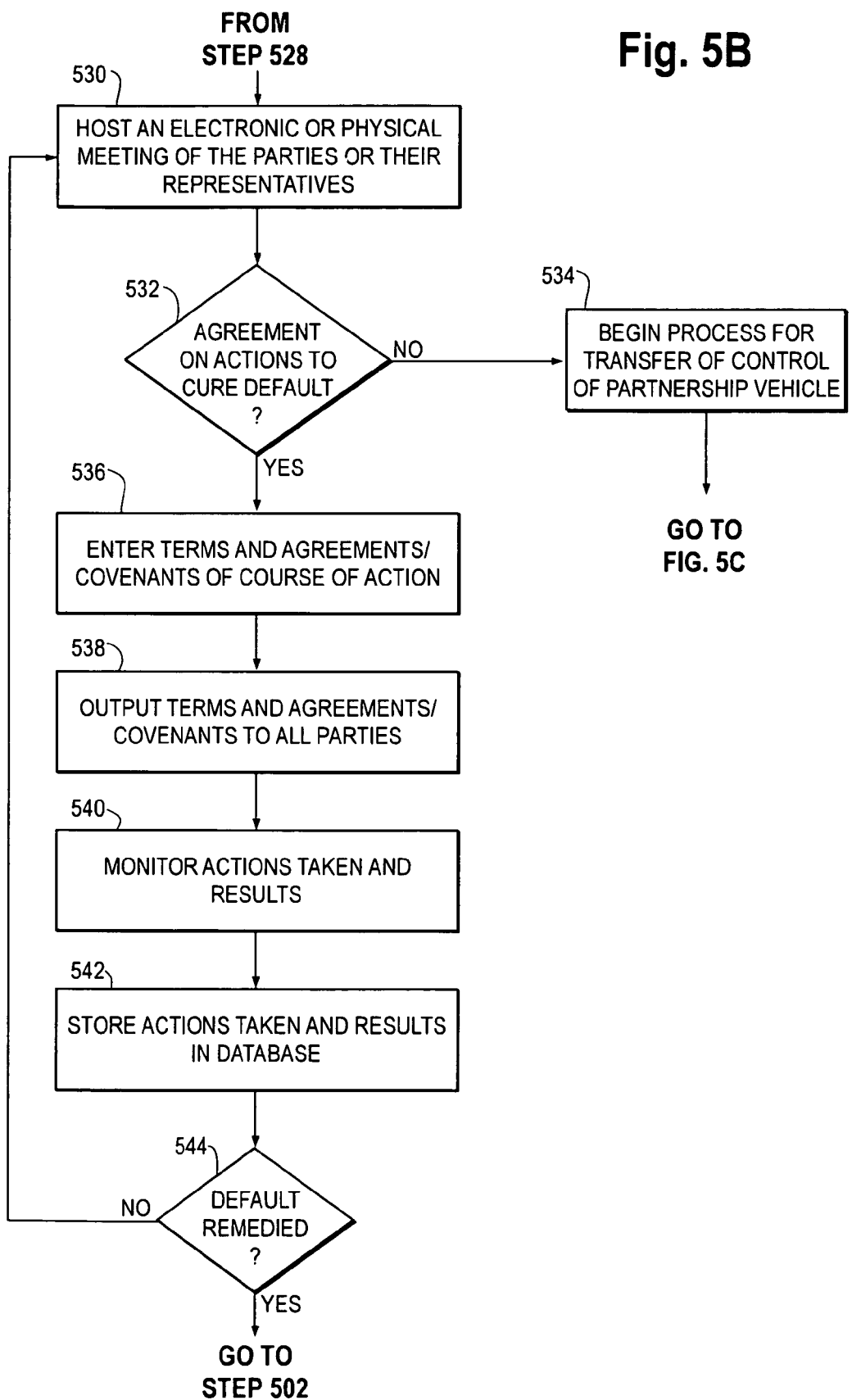
Figure 5C:
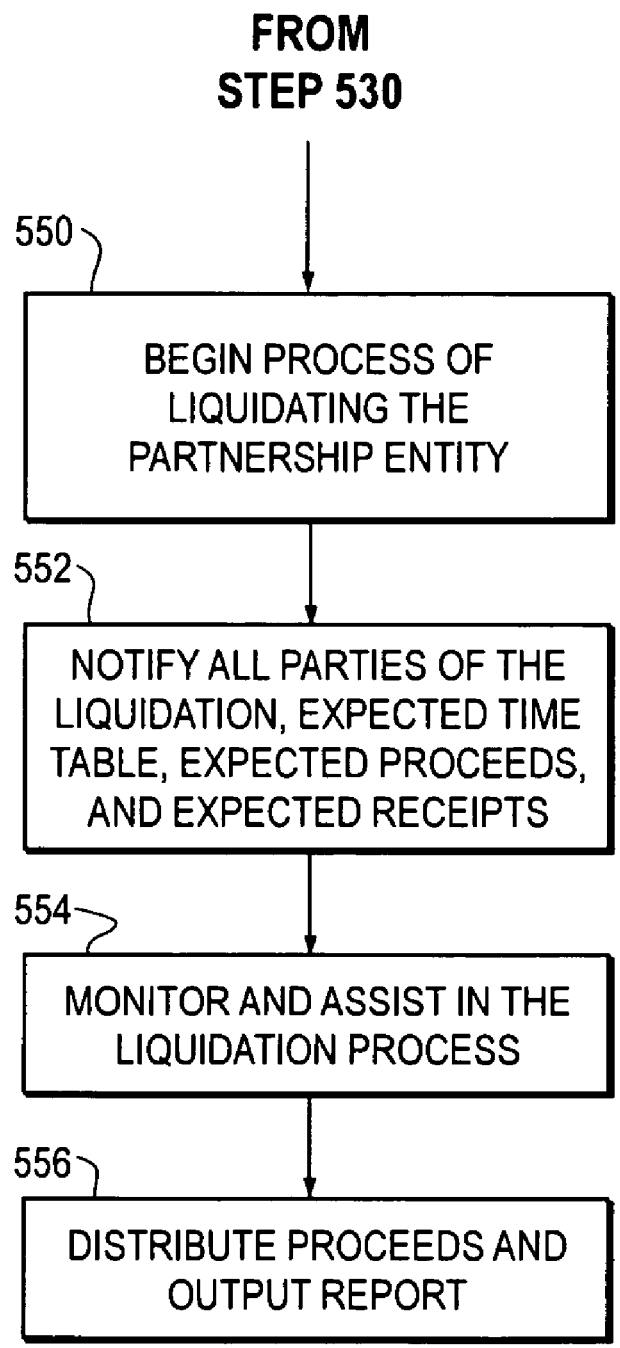

FIG. 1 is an illustration of an embodiment.
FIG. 1A is an illustration of an embodiment.
FIG. 1B is an illustration of an embodiment.
FIG. 2 is an illustration of an embodiment.
FIG. 3 is an illustration of an embodiment.
FIG. 4 is an illustration of an embodiment.
FIG. 5 is an illustration of a flow chart for an embodiment.
FIG. 5A is an illustration of a flow chart for an embodiment.
FIG. 5B is an illustration of a flow chart for an embodiment.
FIG. 5C is an illustration of a flow chart for an embodiment.

IV. MODES

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or as evident from the context hereinafter. Logic flow can be implemented in discrete circuits. Computer-readable media, as used herein can comprise at least one of a RAM, a ROM, A disk, an ASIC, and a PROM. Industrial applicability is clear from the description, and is also stated below.

By way of the following prophetic teaching, there is provided computer support, as in a data processing system, for implementing financing including a private constant-dollar instrument that is consistent with a pre-determined Islamic (Shariah) compliant standard. The computer support for the computer-aided method of financing may be implemented by one computer system (FIG. 1) or it may be implemented by multiple computers (FIG. 1 and FIG. 1A) that may be connected or networked together in an ongoing manner, intermittently, or one time. In any case, control of such system can be enabled in accordance herein discussed below. The computer system (FIG. 1) may include a computer 14, an input device 158 such as a keyboard 12, a storage device 10 such as a memory, a memory 18 including a program, such as a disk (note the storage 10 and memory 18 may or may not be the same device, depending on the implementation desired) including software, and an output device 16 such as a monitor screen, computer-to-computer communication device (e.g., modem), and/or a printer.

In an embodiment herein, there can be a computer-readable media or memory 18 tangibly embodying a program of instructions executable by the computer system to perform the steps of: receiving definition of a private constant-dollar instrument, the definition including a respective claim division on cash flow and on an asset; receiving data including actual cash flow datum and actual asset datum; calculating respective values for each of the claims on the cash flow and the asset; and generating output including the respective values for each of the claims on the cash flow and the asset. Indeed the program instructions can be such as to carry out any computer-assisted method or operation discussed herein.

In one embodiment, the computer support may include a process for controlling a computer system that implements financing including a private constant-dollar instrument that is consistent with a pre-determined Islamic (Shariah) compliant standard. The system for controlling a computer system may include a switching system (FIG. 1B), which at a simplest level can be menu displayed on a computer screen. The system for controlling may be structured to offer choices to solicit predetermined data or trigger predetermined operations, including, for example: entering terms of a financing agreement including a private constant-dollar financial instrument 180; outputting the agreements and supporting documentation 182; inputting data on an actual cash flow and asset 184; inputting data on actual inflation 186; administering the financing transaction 188; and carrying out a default curing routine 190.

In one embodiment, a plurality of computers can cooperate to implement a private constant-dollar instrument or financing. For example, each computer can utilize a computer-to-computer communication device, and such as a network (e.g., telephone, Internet, cable, etc.) with electronic transmission means for (e.g., email, real time communication system, or the like), e.g., with a corresponding receiver system, in communicating between the computers to enable the computers to cooperate in carrying out the implementing.

With regard to application of the standard, any computer involved in a transaction associated, electronically, with the private constant-dollar instrument (e.g., computer 14) can use computerized application of a Shariah-compliance standard. Such standards may be debatable in the abstract, but can be specified to a computer, whatever that standard or standards may be. For example, one or more Shariah scholars can articulate a standard that is embodied into computing for application analyzing any aspect of a transaction or the instrument.

If implemented by more than one computer (FIG. 1A), the system may include at least one from a group including, but not limited to: a financial intermediary computer 102; a depository institution computer 104; a commercial bank computer 106; a credit union computer 108; an insurance company computer 110; a pension fund computer 112; a finance company computer 114; a leasing company computer 116; an investment company computer 118; a mutual fund computer 120; a real estate investment trust computer 122; a special purpose entity computer 124; a limited liability partnership computer 126; a trust computer 128; a limited liability company computer 130; a partnership computer 132; a corporation computer 134; a servicing computer 136; a reporting computer 138; a broker computer 140; a trading computer 142; a clearing computer 144; a rating agency computer 146; an investment banker computer 148; a mortgage banker computer 150; a user of funds computer 152; a supplier of funds computer 154; and an other computer 156. Any or all of the computer systems may include one or all of the following: an input device 158, such as a keyboard 158; a storage device 160; an output device 162; a memory 164, including a program, the foregoing articulated in greater exemplification with regard to FIG. 1, e.g., with the storage device 160 and memory 160 being separate or the same, as one may prefer in one implementation or another.

A servicing computer 136 may be any computer that is servicing any financial instrument in any of the plurality of tiers (e.g., tranchees) of Islamic financing instruments with constant-dollar agreements. The servicing computer 136 may administer a computerized process for monitoring financing agreements and resolving defaults. A broker computer 140 may be the computer of a securities broker, a broker/dealer, and/or a broker's broker. Other computers that might be connected at some time and thus participate in the computer-aided method of funding include, but are not limited to: a business computer, a nonfinancial corporation computer 134, a financial institution computer, a consumer computer, a household computer, a student computer, an educational institution computer, a religious institution computer, a charitable institution computer, an academic computer, a researcher computer, a foreign investment-creating computer, a foreign servicing computer 136, a foreign investment banker computer 148, a foreign trading computer 142, a foreign broker computer 140, a foreign rating agency computer 146, a foreign reporting computer 138, a foreign investment manager computer, a foreign investment advisor computer, a foreign bank computer, a foreign insurance computer, a foreign pension fund computer 112, a foreign clearing computer 144, a foreign investor computer, a foreign accounting computer, a foreign issuer computer, a foreign financing company computer, a foreign leasing company computer 116, a foreign business computer, a foreign nonfinancial corporation computer 134, a foreign financial institution computer, a foreign business computer, a foreign consumer computer, a foreign household computer, a foreign student computer, a foreign educational institution computer, a foreign religious institution computer, a foreign charitable institution computer, a foreign academic computer, and/or a foreign researcher computer.

If the computer-aided method of Islamic compliant financing including a private constant-dollar instrument does involve more than one computer, the computers that may be part of the computer system may connect into the system on a continuing basis, intermittently, or on a one-time basis. Any computer that may be involved, regardless of whether one or more is involved, may be in any form or combination, including, but not limited to: a mainframe computer and terminal(s) configuration, a client/server computer configuration, a configuration comprised of a personal computer, a desk-top computer, a lap-top computer, a pocket computer, a palm computer, a personal digital assistant, a digital cell phone or other portable device, but other ways of thinking, embodiments can extend to comprising a Wi-Fi node, an embedded processor, a car or other vehicle computer, a light-wave computer, a biological or hybrid computer, a quantum computer, etc.

If more than one computer is involved, the computers may be connected, or not connected, in any pattern. The connections need not be continuously maintained; they may be intermittent, one-time or ongoing. One or more of these connections may involve the use of the Internet, an intranet, e-mail, instant messaging, text messaging, voice mail, a local area network (LAN), a wide area network (WAN), a twisted pair of copper wires, a coaxial cable, a cellular network, Wi-Fi, wide area Wi-Fi, a Wi-Fi network, a light-wave transmission, infrared, and/or a wireless connection. One of more of the connections may involve one-way communication only. One or more may involve two-way communication. Real time communications are another possibility.

More than one of any variety of computer may be involved in the computer-aided method of Islamic financing with constant-dollar agreements. For example, there may be more than one user of funds computer 152, more than one supplier of funds computer 154, more than one broker computer 140, etc.

As more particularly regards embodiments, there can be a computer-aided method of illustrating, the method can include: specifying to a computer system, a private constant-dollar instrument, including defining a respective claim division on cash flow and an asset; entering actual cash flow datum and actual asset datum; calculating, the computer system, respective values for each of the claims on the cash flow and asset; and, generating with the computer system, an illustration of the private constant-dollar funding transaction.

Private constant-dollar financial instruments can be financing instruments issued by (i.e., they are liabilities of or interests in) funds users who are subject to default risk, including (but not limited to): individuals, households, for-profit businesses, corporations, partnerships, limited partnerships, sole proprietorships, financial intermediaries, depository institutions, banks, credit unions, thrifts, savings and loans, savings banks, insurance companies, investment companies, real estate investment trusts (REITS), limited-liability companies, not-for-profit businesses, nongovernmental organizations, trusts, real estate mortgage investment conduits (REMICS), other pass-through entities, municipal governments (state and local governments), agencies of municipal governments, school districts, water districts, transportation districts, other special purpose districts, and federally sponsored enterprises (e.g., Federal National Mortgage Association, Federal Home Loan Mortgage Corporation, etc.). The issuers of private constant-dollar financial instruments may be domiciled in the U.S. or in other countries.

Unlike the federal government, the issuers of private constant-dollar financial instruments do not have the power to print money. Therefore, unlike securities issued by the national or federal government, private constant-dollar financial instruments are subject to default risk and this default risk may be reduced by matching the payments promised by the instruments to the expected future revenues of the issuer. The fixed real (purchasing power) payments of the private constant-dollar financial instruments can be tailored to produce a reasonable, or even the best possible, match between promised real payment amounts and the expected future real revenues of the issuer, thus reducing the default risk relative to alternative instruments which do not have fixed real payments and cannot, therefore, be tailored to produce a reasonable, or even the best possible, match between promised payments and expected future real revenues.

Note that the use of the U.S. government is illustrative, as the concept applies equally well to other governments that have the power to print money.

Constant-dollar financial instruments are financial instruments whose terms (e.g., payment amounts, rate of return or interest rate, schedule of remaining principal balances, etc.) can be specified in units of constant purchasing power, such as dollars that have been adjusted using an index such as a price index (for example, one of the variations of the Consumer Price Index) so as to maintain constant purchasing power. However, the term "constant-dollar financial instrument" can apply to financial instruments whose terms are specified in units that are held constant in purchasing power and/or are adjusted through the application of some suitable index.

The units that are held constant in purchasing power and/or are adjusted by an index may be any currency (not just dollars) and they may be held constant and/or adjusted by any desired price index or other economic index. The currency may be any national currency (e.g., U.S. dollars, Canadian dollars, Australian dollars, Mexican pesos, British pounds, Swiss francs, euros, yen, rubles, zlotys, Danish kroner, etc.) or any other variety of currency including private and/or local currencies. Possible varieties of the price or other index may include, but are not limited to: 1) a price index for the respective national economy as a whole (e.g., in the U.S., the consumer price index for all urban consumers, the gross domestic product deflator, etc.); 2) a price index for some component of the respective national economy (e.g., a health care price index, a housing price index, a commodity price index, an index made up of a single price such as the price of gold or the price of oil, an export price index, an import price index, a traded goods index, a wholesale price index, a goods price index, an electronic goods price index, a services price index, the consumer price index for a specified urban area, the consumer price index for a specified region, etc.); 3) an economic index for the respective national economy as a whole (e.g., in the U.S., the nominal gross domestic product, the real gross domestic product, productivity, nominal wages, real wages, total nominal labor compensation, total real labor compensation, etc.); and, 4) a local or regional economic index (e.g., regional nominal gross domestic product, regional real gross domestic product, regional productivity, regional nominal wages, regional real wages, etc.)

This context for the term "constant-dollar financial instrument" is applicable herein, and private constant-dollar financial instruments may be comprised of, utilize and/or be derived from one or more other private constant-dollar financial instruments, where the term "constant-dollar financial instrument" applies to instruments whose units that are held constant may be any currency adjusted by any desired price index or other economic index.

Private constant-dollar financial instruments may or may not be "private" in the sense that the data regarding the instrument or the issuer is private. Indeed, in the case of a public issue of private constant-dollar financial instruments, federal and state securities laws mandate extensive public disclosure of data regarding both the securities and the issuer of the securities.

Constant-dollar financial instruments may be converted into equivalent nominal-dollar financial instruments because payments presently are made in nominal dollars and because accounting, both for purposes of reporting and for calculating taxes, is presently carried out in terms of nominal dollars. Two processes have been invented for performing the conversion, both by an inventor herein. The first is disclosed in U.S. Pat. No. 5,237,500 and the second is disclosed in U.S. patent application Ser. No. 09/283,102, U.S. Pat. No. 6,760,710 B1, both incorporated by reference herein. The U.S. patent application titled "MULTIPLE COMPUTER SYSTEM SUPPORTING A PRIVATE CONSTANT-DOLLAR FINANCIAL PRODUCT" which was filed on Jul. 6, 2004 as a continuation in part of U.S. Pat. No. 6,760,710 B1 is also incorporated by reference herein. Further, U.S. patent application Ser. No. 10/957,399 titled "A COMPUTER-AIDED PROCESS OF FUNDING, INCLUDING A PRIVATE CONSTANT DOLLAR INSTRUMENT" which was filed Oct. 1, 2004 is also incorporated by reference. Finally, in the area of prior art regarding Islamic financing, U.S. patent application Ser. No. 10/406,010 titled "DECLINING BALANCE CO-OWNERSHIP FINANCING AGREEMENT" filed Apr. 3, 2003 by inventors Hammour, Mohamad L. et. al. is also incorporated by reference.

As regards embodiments herein directed to a computer-aided process for Islamic compliant financing, the process can include a private constant-dollar financial instrument, may include the step of converting any of the private constant-dollar instruments into an equivalent nominal instrument.

The value of a private constant-dollar instrument may be impacted by a variety of factors, including but not limited to: 1) the credit quality of the instrument; 2) the real return of the instrument; 3) the frequency with which nominal currency amounts are adjusted by the index (i.e., the frequency of adjustment); 4) the index that is used to adjust the nominal currency amounts; and, 5) the underlying currency (e.g., U.S. dollars, euros, yen, pesos, etc.).

The value of a tier of financial instruments may be determined by determining the value of the instruments comprising the tier. Therefore, an embodiment may include the steps of determining a value of a tier responsive to: 1) credit quality of the instruments comprising the tier; 2) the real return of the instruments comprising the tier; 3) the frequency of adjustment of the instruments comprising the tier; 4) the index (or indices if more than one index) used to adjust the nominal currency amounts of the instruments comprising the tier; and, 5) the underlying currency or currencies of the instruments comprising the tier.

Private constant-dollar financial instruments that hold purchasing power constant (by adjusting the nominal currency amounts by an agreed upon price index) are distinguished from other private financial instruments (i.e., financial instruments that are not constant-dollar instruments) by their virtual elimination of inflation risk and their ability to reduce default risk. They may also reduce interest rate risk because real interest rates are less volatile than nominal interest rates.

Examples of private constant-dollar financial instruments include, but are not limited to:
1. Constant-dollar mortgages.
2. Constant-dollar construction loans.
3. Constant-dollar residential mortgages, where the mortgage or deed of trust securing the note is a mortgage or deed of trust on a 1 to 4 family residential property.
4. A constant-dollar reverse loan, including a constant-dollar reverse mortgage which enables a consumer to tap the equity in their residence by receiving payments of constant purchasing power amounts, with the resulting constant-dollar loan being repaid through the sale of the residence at some defined point.
5. Constant-dollar commercial mortgages, where the mortgage or deed of trust securing the note is a mortgage or deed of trust on commercial property including office, retail, industrial, multi-family residential, and mobile-home properties.
6. Constant-dollar second mortgage or home-equity loans.
7. Constant-dollar second mortgage or deed-of-trust financing for commercial properties.
8. Constant-dollar personal loans.
9. Constant-dollar auto loans.
10. Constant-dollar vehicle loans.
11. Constant-dollar loans to finance consumer durables.
12. Constant-dollar leases.
13. Constant-dollar leases to finance automobiles.
14. Constant-dollar leases to finance consumer durables.
15. Constant-dollar leases to finance boats or ships.

16. Constant-dollar leases to finance business property.
17. Constant-dollar leases to finance aircraft, aircraft engines, airframes, combinations thereof, railroad rolling stock, trucks, buses, trams, trollies or lorries.
18. Constant-dollar leases to finance real property.
19. Constant-dollar leveraged-leases where the lessor finances a large portion of the purchase price of the asset with a nonrecourse constant-dollar loan that is secured by a first claim on the leased asset.
20. Constant-dollar business loans.
21. Constant-dollar term loans.
22. Constant-dollar notes.
23. Constant-dollar international lending contracts.
24. Constant-dollar bonds including bullets, serials, zero-coupon and combinations thereof.
25. Constant-dollar fully-amortizing bonds.
26. Constant-dollar partially-amortizing bonds.
27. Constant-dollar bonds or loans or loans with any desired amortization structure.
28. Constant-dollar bonds with sinking funds.
29. Constant-dollar private placement bonds.
30. Constant-dollar public issue bonds.
31. Constant-dollar medium-term notes, which are constant-dollar bonds (that can be of any maturity, in spite of the name) that are issued on a continuing basis over time rather than through the batch process of traditional underwriting.
32. Constant-dollar debentures.
33. Constant-dollar subordinated debentures.
34. Constant-dollar capital notes.
35. Constant-dollar mortgage bonds.
36. Constant-dollar equipment trust certificates.
37. Constant-dollar asset-backed securities.
38. Constant-dollar mortgage-backed securities.
39. Constant-dollar preferred stock.
40. Constant-dollar fully-amortizing preferred stock.
41. Constant-dollar limited partnership units.
42. Constant-dollar preferred-return LLC (Limited Liability Company) units.
43. Constant-dollar income bonds, where the issuing organization makes the promised real (purchasing power) payment only if it has income sufficient to make the payment. Payments that are not paid may cumulate with or without compounding (payment of interest on interest).
44. Constant-dollar deposits.
45. Constant-dollar certificates of deposit.
46. Constant-dollar Eurodollar deposits.
47. Constant-dollar currency, which is created when constant-dollar deposits are made checkable and/or transferable through electronic funds transfer.
48. Constant-dollar insurance.
49. Constant-dollar whole life policies.
50. Constant-dollar universal life policies.
51. Constant-dollar variable life policies.
52. Constant-dollar annuities.
53. Constant-dollar fixed annuities.
54. Constant-dollar guaranteed investment contracts.
55. Constant-dollar municipal bonds.
56. Constant-dollar tax-exempt bonds.
57. Constant-dollar general obligation bonds.
58. Constant-dollar revenue bonds.
59. Constant-dollar double barrel bonds.
60. Constant-dollar instruments with variable real returns.
61. Constant-dollar instruments with caps and/or floors on the equivalent nominal returns.
62. Constant-dollar instruments with caps or restrictions on the nominal payment amounts.
63. Constant-dollar instruments with caps or restrictions on the nominal balance amounts.
64. Constant-dollar instruments convertible into other constant-dollar instruments.
65. Constant-dollar instruments that include options.
66. Constant-dollar instruments with the option to choose a different (constant purchasing power) currency—e.g., constant euros, constant yen, constant pounds, constant pesos, etc.
67. Constant-dollar instruments with the option to choose a different index—e.g., a services cost index, a commodity cost index, a gold price index, an oil price index, an energy price index, etc.
68. Constant-dollar instruments convertible into common stock.
69. Common stock convertible into constant-dollar instruments.
70. Constant-dollar instruments with warrants attached.
71. Constant-dollar instruments convertible into nominal instruments.
72. Nominal instruments convertible into constant-dollar instruments.

The user of the funds (issuer of the constant-dollar instrument) may be domiciled in U.S. and/or another country. The underlying currency may U.S. dollars, Canadian dollars, Mexican pesos, British pounds, euros, yen, Australian dollars or any other currency. The instrument may offer the investor and/or the issuer the option to choose from a list of one or more currencies and/or one or more indices.

Private constant-dollar financial instruments may also include financial instruments that are derived from one or more other private constant-dollar financial instruments. Possible examples of these additional possible private constant-dollar financial instruments include, but are not limited to:

1. Constant-dollar mutual fund shares, which are undivided interests in the net assets of an open-end investment company that invests predominantly in private constant-dollar financial instruments.
2. Constant-dollar pass-through securities, which are undivided interests in a pool of financial assets that are predominantly private constant-dollar financial instruments.
3. Constant-dollar variable annuities, which are variable annuities for which the investment portfolio for a variable annuity is made up predominantly of private constant-dollar financial instruments.
4. Constant-dollar separate accounts, which are separate accounts of an insurance company that are invested predominantly in a portfolio of private constant-dollar financial instruments.
5. Constant-dollar investment company shares, which are shares in an investment company that invests predominantly in private constant-dollar financial instruments.
6. Constant-dollar closed-end investment company shares, which are shares in a closed-end investment company that invests predominantly in private constant-dollar financial instruments.
7. Constant-dollar trusts, which are interests in trusts that invest predominantly in private constant-dollar financial instruments.
8. Constant-dollar unit investment trusts, which are unit investment trusts that invest predominantly in private constant-dollar financial instruments.
9. Constant-dollar pass-through securities issued by real estate mortgage investment conduits, which are real estate mortgage investment conduits that invest predominantly in private constant-dollar mortgages.
10. Shares in constant-dollar real estate investment trusts, which are real estate investment trusts that invest predominantly in private constant-dollar financial instruments.
11. Constant-dollar swaps, which are swaps where one or more of the payment streams involved in the swap is a payment stream of a private constant-dollar financial instrument.
12. Constant-dollar pensions, which are pensions that pay fixed purchasing power amounts.
13. Constant-dollar pension plans, which are pension plans that invest predominantly in private constant-dollar securities.
14. Constant-dollar defined benefit plans, which are defined benefit pension plans that invest predominantly in private constant-dollar financial instruments.
15. Constant-dollar defined contribution plan, which are defined contribution pension or retirement plans that invest predominantly in private constant-dollar financial instruments.
16. Constant-dollar 401(k) or 403(b) plans, which are 401(k) or 403(b) plans that invest predominantly in private constant-dollar financial instruments.
17. Constant-dollar Independent Retirement Accounts (IRAs), which are IRAs that invest predominantly in private constant-dollar financial instruments.
18. Constant-dollar Keoghs, UGMA, UTMA, Coverdell, Health Savings Accounts, college savings plans, travel expense saving account or other accounts designed or created to cover certain expenses and may include tax incentives such as the ability to invest with before tax dollars, defer taxes, eliminate taxes, etc.
19. A constant-dollar futures contract, which is a futures contract involving one or more private constant-dollar financial instruments.
20. A constant-dollar currency futures contract, which is a futures contract involving two constant-dollar currencies (e.g., constant dollars and constant euros, constant euros and constant pounds, constant dollars and constant pesos, etc.).
21. A constant-dollar forward, which is a forward contract involving one or more private constant-dollar financial instruments.
22. A constant-dollar currency forward, which is a forward contract involving two constant-dollar currencies (e.g., constant dollars and constant euros, constant euros and constant pounds, constant dollars and constant pesos, etc.).
23. A constant-dollar options contract, which is an option contract involving a private constant-dollar financial instrument, a private constant-dollar future, a private constant-dollar forward, or a private constant-dollar swap.
24. A constant-dollar derivative, which is a financial derivatives contract involving a constant-dollar financial instrument or product.

The term "tier" generally refers to a set of financial instruments. A set of financial instruments is one or more financial instruments. The tier may be fixed (i.e., closed) or ongoing (open-ended). For example, a tier can be what is sometimes referred to as a tranche.

The constant-dollar agreements incorporated into the terms of a private constant-dollar financial instrument may facilitate efficient, low-cost Islamic compatible financing by removing risk from the financing process, providing suppliers of funds with a range of risk/return investment options, and eliminating conflicts between suppliers and users of funds regarding the future course of inflation, which cannot be known at the time that the financing agreement is made.

Embodiments may remove risk from the financing process and reduce the cost of capital because the constant-dollar agreements may eliminate inflation risk and facilitate a reduction in default risk. Inflation risk may be eliminated for suppliers of funds because they are funding future real (net of inflation) expenditures with real financial assets whose value and income are adjusted to eliminate the impact of inflation rather than with nominal financial assets whose value and income may be reduced by the unknown future course of inflation. Inflation risk may be eliminated for users of funds because they are financing real assets that produce real (net of inflation) income with real financial liabilities rather than nominal liabilities, thus eliminating fluctuations in real income caused by the impact of future unknown inflation on their financing liabilities. A reduction in default risk may be facilitated because the real, net of inflation, payments (claims of the financing partners on real cash flows) may be matched to the expected real income of the real assets being financed, thus reducing the probability that income will be less than the payments.

The constant-dollar agreements may offer suppliers of funds a range of risk/return options that would not otherwise be available, thus better meeting their needs and reducing the cost of capital. In the absence of constant-dollar agreements, the claims on cash flows and assets may be divided on the basis of percentage interests or on the basis of nominal dollar claims. In either case, the range of risk/return options available to suppliers of funds will be reduced. In particular, it may become impossible for suppliers of funds to achieve a low risk while also accepting a long maturity. This may be especially important for investors seeking a higher return with low risk because, on average, suppliers of funds must accept long maturities in order to achieve higher returns and if accepting a long maturity means higher risk, then there will be no low risk, higher return investments for suppliers of funds.

If claims on cash flows and assets are divided on the basis of percentages, then every claim has exactly the same risk/return tradeoff. Therefore, there is no ability to offer investors (funds suppliers) a range or a choice of risk/return opportunities. Also, because all investments by suppliers of funds are equity investments, which usually are higher risk, there may be few low risk investments available to suppliers of funds. This scarcity may drive up the price of these low risk investments, which drives down their return.

If claims on cash flows and assets are divided on the basis of nominal dollar amounts, then inflation risk is introduced and conflict arises between suppliers and users of funds regarding the unknown future course of inflation. The longer the maturity of the financing, the greater the inflation risk and the greater the potential conflict regarding future inflation. Because the inflation risk increases with maturity, accepting a long maturity means that suppliers of funds must accept higher risk when they accept longer maturities. Suppliers of funds may be offered a range of risk/return opportunities but the choices offered them are suboptimal because of the inflation risk that is introduced by the nominal dollar agreements. The longer the maturity, the more suboptimal is the risk/return choice offered by the use of nominal dollar agreements. Because suppliers of funds must often be willing to accept long maturities in order to achieve higher returns, the result may be that suppliers of funds have no low risk, higher return investment choices.

In some embodiments herein, claims on cash flows and assets are divided on the basis of constant dollars. Any number of levels of preference regarding claims on cash flows and assets may be used to tailor investments to the differing risk/return preferences of investors. The constant dollar agreements may eliminate inflation risk and may facilitate a reduction in default risk. Therefore, an optimal choice of risk/return alternatives may be offered to suppliers of funds, thereby minimizing the cost of capital (cost of financing).

Risk and, therefore, the cost of capital may be further reduced by the cooperation between suppliers and users of funds that is facilitated by: 1) constant-dollar agreements that eliminate conflicts between suppliers and users of funds regarding the unknown future course of inflation; and, 2) the computer-aided process for administering the agreements and curing defaults—a cooperative process that is again facilitated by the constant-dollar agreements that eliminate inflation risk and conflicts regarding the future unknown course of inflation.

Indeed, the benefits of the increased cooperation in terms of reduced risk and a lower cost of capital may be such that suppliers and users of funds who are not concerned with Islamic (Shariah) compliance may wish to use such as the foregoing.

Constant-dollar agreements are agreements whose terms (e.g., claims on cash flows, payment amounts, rate of return, claims on assets, buy-out amounts, schedule of remaining principal balances, etc.) may be specified in units of constant purchasing power, such as dollars that have been adjusted using an index such as a price index (for example, one of the variations of the Consumer Price Index) so as to maintain constant purchasing power. However, the term "constant-dollar agreement" can apply to agreements whose terms are specified in units that are held constant in purchasing power and/or are adjusted through the application of any suitable index.

The units that are held constant in purchasing power and/or are adjusted by an index may be any currency (not just dollars) and they may be held constant and/or adjusted by any desired price index or other economic index. The currency may be any national currency (e.g., U.S. dollars, Canadian dollars, Australian dollars, Mexican pesos, British pounds, Swiss francs, euros, yen, rubles, zlotys, riyals, dinar, kroner, etc.) or any other variety of currency including private and/or local currencies. Possible varieties of the price or other index may include, but are not limited to: 1) a price index for the respective national economy as a whole (e.g., in the U.S., the consumer price index for all urban consumers, the gross domestic product deflator, etc.); 2) a price index for some component of the respective national economy (e.g., a health care price index, a housing price index, a commodity price index, an index made up of a single price such as the price of gold or the price of oil, an export price index, an import price index, a traded goods index, a wholesale price index, a goods price index, an electronic goods price index, a services price index, the consumer price index for a specified urban area, the consumer price index for a specified region, etc.); 3) an economic index for the respective national economy as a whole (e.g., in the U.S., the nominal gross domestic product, the real gross domestic product, productivity, nominal wages, real wages, total nominal labor compensation, total real labor compensation, etc.); and, 4) a local or regional economic index (e.g., regional nominal gross domestic product, regional real gross domestic product, regional productivity, regional nominal wages, regional real wages, etc.)

Under Islamic law, the payment of interest and compounding (the payment of a return on a return) may be forbidden. However, partnerships where profits are shared between suppliers and users of funds and lease-to-own financing may be allowed. In some embodiments, partnership structures and/or lease-to-own financing with constant-dollar agreements are used to create a finance that is: 1) consistent with a predetermined Shariah (Islamic) compatible standard; and, 2) lowers the cost of capital and increases the availability of funds, thus facilitating increased economic growth and incomes. This may involve the use of instruments of preferred equity interests rather than debt instruments, thus eliminating payment of interest. In addition, if desired, agreements may be structured so as to avoid payment of a return on a return.

Structuring the financing agreements as constant-dollar agreements may mean that the agreements could be interpreted to be agreements regarding the allocation of future flows of "standardized baskets of goods" rather than allocations of future flows of money. This may be true because a price index which is used to calculate the nominal dollar amounts (given the agreed-upon constant dollar, or purchasing power, amounts) may be based on a standardized basket of goods. Such an interpretation might further emphasize the interpretation that there is no payment of interest.

Although the focus can be on Islamic compliant financing with constant-dollar agreements where there is no debt and therefore no payment of interest, depending on the implementation, advantages (e.g., lower risk and, therefore, lower financing costs) can be such that suppliers and users of funds who are not subject to Islamic Law may desire to utilize an embodiment herein. For users of some embodiments herein that are not subject to Islamic Law, it may be that tax savings can be realized if an embodiment is applied to debt financing because of the ability of borrowers to deduct interest payments (e.g., the interest on mortgage payments).

Therefore, embodiments need not be restricted to purely Islamic compliant financing with no debt instruments. Embodiments can also include non-Islamic financing that utilizes debt instruments and involves the payment of interest. The debt financing may be structured to act like preferred equity capital by structuring the constant-dollar debt as income bonds—financing where payment of interest and principal is contingent on available cash flow and default will not result in bankruptcy proceedings—thus preserving the benefits of lower risk and lower financing costs while also producing tax savings as a result of the tax deductibility of interest payments.

In lease-to-own Islamic financing with constant-dollar agreements, the party seeking the financing or user of funds (the lessee) signs a constant-dollar lease for the use of the asset. The lease may be long-term. It may be a triple-net lease in which the lessee is responsible for the payment of all taxes, insurance, operating and maintenance and other expenses. Because it is a constant-dollar lease, the payments are fixed in terms of purchasing power. The nominal dollar amounts of the payments are adjusted at regular intervals (e.g., annually, semi-annually, quarterly, monthly, etc.) using an agreed-upon index so as to maintain the agreed-upon purchasing power amount. The constant-dollar (purchasing power) amounts may be constant over the life of the lease, decrease over time, increase over time, or follow any other desired pattern.

Upon the receipt of the last lease payment by the lessor, the lessee may become the sole owner of the asset. A final payment after the final lease payment may be utilized in order for the lessee to buy out the interest of the supplier of funds and become the sole owner of the asset. The final payment may be a specified constant dollar amount. The lessee may also have a right to buy-out the supplier of funds during the term of the lease by paying a specified constant-dollar amount and becoming the sole owner of the asset. This constant-dollar buy-out amount may decline over the life of the lease, reaching zero when the last payment is made. The purchase price of the asset, constant-dollar lease payments and constant-dollar buy-out amounts may together define a real (net of inflation) return to the lessor for any given buy-out time, given that payments are made on time as agreed. The real return may or may not change with the timing of the buy-out of the provider of funds.

The lessee, or user of funds, may have a claim on the asset being financed that is subordinated to the claim of the supplier of funds. This subordinated claim on the asset being financed may be a residual, or common equity claim; a subordinated claim defined in terms of constant-dollar amounts; or some combination thereof. The subordinated claim on the asset being financed may increase as more lease payments are made. It may become equal to the asset being financed when the final lease payment is made or when the lessee buys out the supplier of funds—at which point the claim of the supplier of funds on the asset goes to zero.

Embodiments may convert the constant-dollar amounts into equivalent nominal-dollar amounts. It may allow the constant-dollar buy-out amounts to be set so as to: 1) maintain a constant real return to the lessor regardless of the timing of the buy-out; 2) increase the real return to the lessor in the event of an early buy-out; 3) reduce the real return to the lessor in the event of early buy-out; or 4) create any specified real return (including a current market real return, current market real return plus a specified margin, etc.) in the event of early buy-out.

If buy-outs during the term of the lease are allowed, the right to buy-out the supplier of funds during the term of the lease may include the right to partial buy-outs (financing pre-payments) as well as full buy-outs of the remaining interest of the supplier of funds. In the event of a partial buy-out, the number and/or the amounts of the remaining constant-dollar payments and the remaining constant-dollar buy-out amounts may be adjusted so to maintain an agreed-upon real rate of return for the lessor. For example, if the constant-dollar amount of the partial buy-out (pre-payment) is equal to 10% of the current constant-dollar buy-out amount, the constant-dollar payment amount and constant-dollar buyout amount of each remaining period may be reduced 10%. Or, if the constant-dollar payment amount is not changed, the number of remaining payments (and also possibly the final constant-dollar payment amount) and associated constant-dollar buy-out amounts may be changed so as to maintain some specified real rate of return for the lessor (the specified real return may be the lessor's full-term real rate of return or a function thereof, a current market real return or a function thereof, etc.). There may or may not be limitations or conditions on early buy-outs (partial and/or full), including possible penalties or rewards.

Examples of assets that may be financed using lease-to-own Islamic financing with constant-dollar agreements include, but are not limited to: houses; apartment complexes; office buildings; shopping centers; warehouses; factories; aircraft; ships; locomotives; rail cars; containers; buses; trucks; fork lifts; automobiles; pipelines; rail lines; roads; machine tools; computers; factory equipment; office equipment; boats; refrigerators; stoves; dish washers; freezers; air conditioners; heat pumps; furnaces; solar panels; windmills; televisions; stereos; home entertainment systems; and computer durables. The assets may generate cash flow for the lessee, which the lessee may use to make the lease payments. Or, the assets may generate a stream of services or utility for the lessee, in return for which the lessee is willing and able to make lease payments.

Examples of possible users of funds (lessees) include, but are not limited to: individuals; couples; families; households; businesses; corporations; partnerships; limited-liability partnerships; limited liability companies; sole proprietorships; trusts; foundations; co-operatives; not-for-profit corporations; educational institutions; religious organizations; national governments; state and local governments; government agencies; governmental units; and government sponsored enterprises.

Examples of possible suppliers of funds include, but are not limited to: financial institutions; finance companies; leasing companies; banks; credit unions; insurance companies; pension funds; investment companies; mutual funds; hedge funds; investment bankers; foundations; individuals; couples; families; households; businesses; corporations; partnerships; limited-liability partnerships; limited liability companies; sole proprietorships; trusts; foundations; co-operatives; not-for-profit corporations; educational institutions; religious organizations; national governments; state and local governments; government agencies; governmental units; and government sponsored enterprises. The supplier of funds may choose hold its interest in the asset through a limited-liability pass-through entity such as a limited liability company or a limited liability partnership.

Lease-to-own Islamic financing using constant-dollar agreements may or may not use a partnership vehicle in structuring the financing. If a partnership vehicle is utilized (FIG. 3): 1) the asset is owned by the partnership vehicle; 2) the user of funds (the lessor) leases, using constant-dollar terms, the asset from the partnership vehicle and owns a common equity interest in the partnership vehicle; and, 3) the supplier (or suppliers) of funds provide funds to the partnership vehicle to purchase the asset and hold preferred equity interests (with constant-dollar terms) in the partnership vehicle.

Possible partnership vehicles that may be utilized include, but are not limited to: a limited liability company, a limited liability partnership, a partnership, a corporation, a sub-chapter S corporation, a not-for-profit corporation, and a trust.

Upon the payment of the last constant-dollar lease payment (or earlier, if the lessee exercises a right to early buy out), the preferred equity interest of the supplier may go to zero and the holder of the common equity interest (the lessee) becomes the sole owner of the partnership and, therefore, the asset that was financed. The value of the common equity interest owned by the lessee may increase as lease payments are made and the constant-dollar claim of the preferred equity interest on the assets of the partnership vehicle declines. The constant-dollar buy-out amount for a preferred equity interest may equal the constant-dollar claim on assets of the preferred equity interest, or it may be greater if there are early buy-out penalties, or it may be less if there are incentives for early buy outs.

If a partnership vehicle is not utilized (FIG. 2): 1) the asset is owned by the supplier of funds (the lessor) either directly or through limited liability pass-through entity such as limited liability company or a limited liability partnership; 2) the user of funds (the lessee) leases, using constant-dollar terms, the asset from the supplier of the funds (the lessor); and, 3) the user of funds (the lessee) and the supplier of funds (the lessor) do not share in the ownership of the asset—the asset is owned by the lessor until the end of the term of the lease (or until the lessee buys out the asset from the lessor), at which time ownership of the asset shifts to the (former) lessee.

The lessee does not hold a common equity interest in the asset being financed until the financing has been fully repaid—either through payment of all of the constant-dollar lease payments (possibly plus a final buy-out amount) or through early buy-out of the asset from the lessor. If the constant-dollar buy-out amount declines as lease payments are made, the lessee may build up implicit equity in the asset being financed. This implicit equity may or may not be evidenced by providing the lessee with a subordinated (to the preferred interest of the lessor) claim on the asset being financed. Regardless, there may or may not be any way for the lessee to access the implicit equity other than by exercising a right of early buy out.

The lease-to-own financing may be structured with a lease term that is less than the number of constant-dollar payments utilized to complete the purchase of the asset by the lessee. If this is the case, the lease may specify a positive constant-dollar buy-out amount upon payment of the final lease payment. At that point, the lessee may have the option of: purchasing the asset for the specified constant-dollar payment; arranging another lease-to-own financing agreement; or returning the asset to the lessor. In the event that the lessee elects to return the asset to the lessor, the lessee may be subject to possible penalties regarding the usage of the asset (e.g., charges for miles driven in excess of a specified amount, etc.) and/or condition of the asset upon its return to the lessor.

If a partnership vehicle is not utilized in lease-to-own Islamic financing using constant-dollar agreements, the financing agreements between the lessee and the lessor are agreements between separate legal entities rather than agreements between partners in a partnership entity. The title to the asset being financed may be held by the lessor (until the completion of the lease-to-own contract) in a legal entity in which the lessee is not an owner. Therefore, the rights and protections of the lessee in the event of a default on the lease payments may be less than if a partnership vehicle had been utilized. The difference in rights and protections may be significant, especially if the lessee has faithfully made many lease payments before the default.

In the absence of the use of a partnership vehicle, the lessee may not acquire an ownership interest in the asset until all of the lease payments have been made or until the lessee exercises right to purchase a remaining value from the lessor under a buy-out agreement. In the event of default after a large number (but not all) of the lease payments have been made, the lessee may not have the resources necessary to exercise a buy-out agreement (assuming that a buy-out agreement exists). Therefore, the lessee may lose all of the implicit equity that was built up by making the lease payments up until the default.

However, if the lease-to-own Islamic financing with constant-dollar agreements utilized a partnership vehicle, the financing agreements of the partnership could have the lessee building an increasing ownership position in the partnership vehicle (and, therefore, the asset being financed) as lease payments are made. This increasing ownership position may be subordinated to the declining ownership position of the suppliers of funds (for example, the lessee may own the common equity interest in the partnership entity and the supplier of funds may own the preferred equity interest in the partnership). Therefore, if a sale of the asset by the partnership entity fails to realize the full value of the asset, the lessee may lose some or all his (her) equity in the asset in the event of default.

However, the existence of this growing equity position (and, depending on the financing agreements, a voice in managing the affairs of the partnership in the event of default) may provide an important protection for lessees that may be lacking in the absence the utilization of the partnership vehicle. This possible additional protection for lessees, together with possible advantages of a reduced probability of involving the legal system in enforcing the financing agreements, may make the use of the partnership vehicle a preferred option in lease-to-own Islamic financing using constant-dollar agreements.

If the lease-to-own financing utilizes a partnership vehicle, the financing agreements may be internal agreements within the partnership vehicle. This may reduce the probability of involving the legal system in the enforcement of the financing agreements. Reducing the probability of involving the legal system in the enforcement of the financing agreements may reduce the risks and costs involved in the financing process. A reduced probability of involving the legal system in the enforcement of the financing agreements may be especially valuable in countries in which the legal system is poorly developed, slow, corrupt, or otherwise deficient. The computer-aided embodiments can be designed to enable administering and enforcing the agreements without involving the legal system in the process (FIGS. 5, 5A, 5A and 5B).

If a partnership vehicle is utilized in lease-to-own Islamic financing using constant-dollar agreements, the asset being financed is owned by a partnership vehicle in which both the user of funds, the lessee, and the provider or providers of funds participate. The lessee signs a constant-dollar lease with the partnership vehicle and owns a common equity interest in the partnership vehicle. The lease may be long-term. It may be a triple-net lease. The lessee may own the common equity interest in the partnership vehicle and control both the asset and the partnership vehicle as long as no default occurs. In the event of a default (breaking one or more of the financing agreements), the process for curing the default may result in a transfer of control to the holder or holders of the preferred equity interests and/or some combination of the holders of the common and preferred equity interests.

The holders of the preferred equity interests in the partnership vehicle are the providers of funds and they have a preferred (to the claim of the holder of the common equity interest) claim on the cash flow (the lease payments) and assets (the assets being financed) of the partnership. The claims of the holders of the preferred equity interests on the cash flow of the partnership vehicle are fixed in constant dollars and may be equal to the constant-dollar lease amounts. Upon receipt of the cash flow from the last scheduled constant-dollar lease payment, the lessee (and owner of the common equity interest) may have bought out the preferred equity interest owned by the provider or providers of funds. Or a final payment (which may be specified in constant dollars) may be utilized in order to buy out the preferred equity interest or interests. Upon the buy out of the preferred equity interest or interests, the lessee becomes the sole owner of the partnership and, therefore, the asset that was financed.

The user of funds, the lessee, may or may not provide some part of the funds used by the partnership vehicle to buy the asset (e.g., a down payment). If the user of funds does provide some part of the funds used by the partnership vehicle to purchase the asset, the user of funds (the lessee) may or may not receive a preferred equity interest in the partnership vehicle in addition to the common equity interest. The user of funds, the lessee, may also receive a preferred equity interest in the partnership vehicle upon payment of a specified number of lease payments. The preferred equity interest may be specified in constant dollars. It may grow in amount as more lease payments are made.

If the user of funds does receive a preferred equity interest in the partnership vehicle, this preferred equity interest may be subordinated to the preferred equity interest or interests held by the suppliers of funds who are financing the asset for the lessee. The preferred interest held by the lessee may have a claim on the asset owned by the partnership vehicle but no claim on the cash flow of the partnership vehicle so long as the original lessee remains the lessee. The preferred claim of the lessee on the asset owned by the partnership vehicle may be adjusted for changes in the constant-dollar amount of the preferred claim of the supplier(s) of funds and/or real depreciation of the asset being financed.

If the asset being financed is sold to a different purchaser, it may be sold for cash (some or all of which may come from financing arranged by the buyer) or it may be financed using the same partnership vehicle. If it is sold for cash, the partnership vehicle may be liquidated, with funds going first to supply the remaining preferred real claim of the supplier(s) of funds to the partnership and the residual, if any, going to the lessee. The sale may be voluntary on the part of the lessee or it may be forced if the lessee has defaulted on the lease.

If the asset is sold using the original partnership vehicle and the sales price exceeds the remaining real claim on the assets of the partnership by the supplier(s) of funds, the original lessee may choose to provide financing to the buyer by taking a preferred real equity interest in the partnership that will have a preferred (to the holder of the new holder of the common equity interest, the new lessee) claim on the income and asset of the partnership entity. The preferred real equity interest received by the original lessee may or may not be subordinated to the preferred real equity interest held by the supplier (s) of funds. The sale of the asset using the original partnership financing vehicle may or may not use the approval of the supplier(s) of funds.

The lessee may fully or partially buy out (subject possibly to limitations, conditions, penalties, rewards, etc.) the preferred equity interest(s) of the supplier(s) of funds during the term of the lease by paying all or some of the constant-dollar buy-out price (which may decline over time, reaching zero with the last constant-dollar lease payment) for the preferred equity interests. The constant-dollar buy-out amounts may be equal to the claim on assets of the partnership vehicle by the supplier(s) of funds, possibly adjusted for pre-payment penalties or rewards. These constant-dollar buy-out amounts, together with the amounts of the constant-dollar claims on the cash flow of the partnership and the purchase price of the preferred equity interests (amount of funds supplied by the supplier of funds) together may define a real return for the supplier of funds. The real return may or not vary as a result of full or partial repayment.

The constant-dollar buy-out amounts for the preferred equity interests may be the amounts of the claim of the preferred (to the holder of the common equity interest) equity interest on the assets of the partnership. If so, the constant-dollar buy-out amounts may be considered to be analogous to the constant-dollar principal amounts of constant-dollar financing.

There may be more than one level of preferred equity interests in the partnership vehicle and, therefore, more than one risk/return choice offered to suppliers of funds. For example, in Islamic lease-to-own constant-dollar financing for owner-occupied housing: 1) a senior preferred interest in the partnership vehicle may be held by a senior supplier of funds who puts up 80% of the purchase price of the house and has first claim on the cash flow (the lease payments) and the assets (the house) of the partnership entity; and, 2) a junior preferred interest in the partnership vehicle may be held by a junior supplier of funds who puts up an additional amount of funds (e.g., 10%, 15% or even the entire remaining 20% of the purchase price) and has second claim on the cash flow (the lease payments) and the assets (the house) of the partnership. The lessee (purchaser) puts up the remaining amount (if any) of the purchase price, holds the common equity interest in the partnership, and has last claim on the income and assets of the partnership (and possibly a preferred equity interest equal to the amount of funds put up). The constant-dollar lease payments may equal the sum of the constant-dollar cash flow claims of the holders of the senior and junior preferred equity interests, with the lessee responsible for paying all taxes, insurance, maintenance and other property expenses. The maturities of the senior and junior preferred interests (i.e., the number of payments to full buy-out) may be the same or different. The real return on the junior preferred interest may be higher than the real return on the senior preferred interest in order to provide compensation for the higher level of risk.

The partnership vehicles that may be utilized in lease-to-own financing include, but are not limited to: a limited liability partnership (LLP), a limited liability company (LLC), a corporation, a trust, and other appropriate legal entities. Islamic terms for appropriate legal entities include musharaka and inan.

The financing agreements for lease-to-own financing utilizing a partnership vehicle may include, but are not limited to: 1) the purchase price of the asset being financed; 2) the amount(s) paid by the supplier(s) of funds and owner(s) of the preferred equity interest(s) toward the purchase of the asset; 3) the amount (if any) paid by the owner of the common equity interest (the lessee) toward the purchase of the asset; 4) the constant-dollar lease payments (number of payments, timing and amounts); 5) the constant-dollar claims of the preferred equity interest(s) on the income and assets of the partnership vehicle; 6) the constant-dollar buy-out amounts for the preferred equity interest or interests; 7) the underlying currency (e.g., U.S. dollars, Mexican pesos, euros, yen, etc.); 8) the index used to adjust the underlying currency for inflation (e.g., the Consumer Price Index for all Urban Consumers); 9) the frequency with which nominal dollar amounts are adjusted for inflation; 10) the initial inflation rate used for the first adjustment period; 11) early buy-out conditions, restrictions, penalties, etc.; 12) performance requirements (or standards) including maintaining insurance coverage, payment of tax liabilities, maintaining the asset to certain standards, etc.; 13) agreements regarding a process for curing defaults, including a process for transfer of control of the partnership entity from the holder of the common equity interest (the lessee) to the holder of the preferred equity interest (the lessor) and/or some form of joint control; and, 14) agreements regarding the use of a computer-aided process to administer and manage the agreements and processes.

The financing agreements for lease-to-own financing that does not utilize a partnership vehicle may include, but are not limited to: 1) the purchase price of the asset being financed; 2) the amount paid by the lessor for the purchase of the asset; 3) the amount (if any) paid by the lessee toward the purchase of the asset; 4) the constant-dollar lease payments (number of payments, timing and amounts); 5) the constant-dollar buy-out amounts for the lessee can buy the asset from the lessor; 6) the underlying currency (e.g., U.S. dollars, Mexican pesos, euros, yen, etc.); 7) the index used to adjust the underlying currency for inflation (e.g., the Consumer Price Index for all Urban Consumers); 8) the frequency with which nominal dollar amounts are adjusted for inflation; 9) the initial inflation rate used for the first adjustment period; 10) early buy-out conditions, restrictions, penalties, etc.; 11) performance requirements including maintaining insurance coverage, payment of tax liabilities, maintaining the asset to certain standards, etc.; 12) agreements regarding a process for curing defaults, including a process for possible sale and/or re-lease of the asset being financed; and, 13) agreements regarding the use of a computer-aided process to administer and manage the agreements and processes.

Default occurs if any of the financing agreements are broken—e.g., a failure to pay the lease payments in a timely manner as specified in the agreements, a failure to maintain insurance coverage on the asset, a failure to pay the taxes on the asset, a failure to maintain the asset to specified standards, etc. In the event of default, the computer-aided process for administering and managing the financing agreements may notify the lessee and the suppliers(s) of funds of the default and the steps in the process for curing the default. The computer-aided process may continue to administer and manage the process until the default is cured.

If the lessee lacks the resources necessary to cure the default and/or is not willing to expend the resources necessary to cure the default, the process for curing the default may result in a variety of outcomes, including but not limited to: 1) a renegotiation of lease terms; 2) a sale of the financed asset for cash; 3) re-lease of the asset to a new lessee/purchaser; 4) a temporary lease of the asset to a different user with the original lessee remaining as the purchaser; and, 5) a subleasing of the asset by the original lessee to a different user.

If the asset is sold or re-leased as a result of the default, the proceeds of the sale and/or re-lease may go first to satisfy the preferred claims of the supplier(s) of funds, with the excess, if any, going to the original lessee/purchaser. If the proceeds from the sale or re-lease of the asset are insufficient to satisfy the preferred claims of the supplier(s) of funds, the process for curing the default may or may not hold the original lessee responsible for additional lease payments that fully satisfy the preferred claims of the supplier(s) of funds.

If the original lessee has positive implicit equity in the asset at the time of the sale or re-lease of the asset—i.e., the value of the asset exceeds the constant-dollar preferred claims of the supplier(s) of funds—the process for curing defaults may or may not include protections that assist the lessee in realizing the implicit equity. the protections may include, but are not limited to: 1) a legal claim to the implicit equity by the lessee (e.g., the common equity interest in the partnership vehicle in the event that the financing utilizes a partnership vehicle); 2) a voice for the lessee in the sale or re-lease of the asset; and, 3) requirements that seek to assure that the sale or re-lease of the asset will realize the current market value of the asset (e.g., advertising and/or other marketing efforts).

If the lease-to-own financing does not involve the use of a partnership vehicle, title to the asset remains with the lessor until the lessee makes the final lease payment and/or buys out the interest of the lessor at the current buy-out price. Therefore, in the event of default, the supplier of funds (the lessor) already has title to the asset being financed. However, the lessee may have no legal claim to any implicit equity if the financing agreement does not create a subordinated (to the lessor) claim on the asset for the lessee.

If the lease-to-buy financing involves the use of a partnership vehicle, the process for curing the default may include a process for transferring legal control of the partnership (and, therefore, the asset being financed) from the holder of the common equity interest (the lessee, the party being financed) to the holder or holders of the preferred equity interests (the provider or providers of funds). This process for the transfer of legal control of the partnership vehicle and the asset being financed may facilitate the process of transferring physical control of the asset, thus facilitating the resolution of the default.

The process may allow the holder of the common equity interest (the lessee, the user of funds) a period of time to cure the default before transfer of control of the partnership (and, therefore, the asset being financed) occurs. The length of the time period may be a function of the nature (and severity) of the default and/or the size of the implicit equity position of the holder of the common equity interest (the lessee). The size of the implicit equity interest may be defined in a number of ways including, but not limited to: 1) the book constant-dollar equity interest which equals the purchase price of the asset in constant dollars (net of depreciation, if applicable) minus the buy-out amounts for the preferred equity interests in constant dollars; 2) the percentage book constant-dollar equity interest which equals the constant-dollar equity interest divided by the purchase price of the asset in constant dollars; 3) the market value equity interest which equals the current market value of the asset minus the buy-out amounts for the preferred equity interests in nominal dollars; and, 4) the percentage market value equity interest which equals the market value equity interest divided by the current market value of the asset.

The process may allow the lessee to have a voice in the sale and/or re-lease of the asset after transfer of the control of the partnership vehicle and the asset. Exercise of this voice by the lessee may facilitate the sale and/or re-lease of the asset at a higher price and protect the implicit equity position (if any) of the lessee in the asset.

In general Islamic financing with constant-collar agreements, use of a partnership-type vehicle may allow the expansion of Islamic financing with constant-dollar agreements beyond lease-to-own financing to include general financing for economic entities of all types (FIG. 4), including, but not limited to: businesses; not-for-profit organizations; governments; government agencies; government-sponsored enterprises; individuals; and households. Any of these economic entities may choose to use Islamic lease-to-own financing with constant-dollar agreements to finance the purchase of specific assets in addition to utilizing general Islamic financing with constant-dollar agreements.

In general Islamic compliant financing with constant-dollar agreements, the partnership vehicle utilized in the financing may be the legal organization of the economic entity itself, including, but not limited to: a limited liability partnership (LLP); a limited liability company (LLC); a partnership; a for-profit corporation; a not-for-profit corporation; a trust; and other appropriate legal entities. Islamic terms for appropriate legal entities include musharaka and inan. If the economic entity is already organized as a legal entity that allows suppliers of funds to participate as partners (e.g., as a corporation, LLP, LLC, etc.), this existing legal entity may be used as the partnership vehicle for general Islamic compliant financing including a constant-dollar instrument. If not (e.g., most individuals and households are not incorporated as suitable legal entities), the economic unit may form a suitable partnership vehicle in order utilize general Islamic compliant financing with constant-dollar agreements.

An economic entity may employ both general Islamic compliant financing including a constant-dollar instrument and lease-to-own financing using a constant-dollar instrument. Multiple levels of partnerships may result if the lease-to-own financing utilizes a partnership vehicle. The partnership vehicle of the economic entity (one level of partnership) is the lessee. As the lessee, the partnership vehicle of the economic entity is itself a partner (e.g., the common equity partner) in the lease-to-own partnership entity. The lessor, which itself may be a business organization (and, therefore, another partnership entity) is also a partner (e.g., a preferred equity partner) in the lease-to-own partnership entity.

Lease-to-own Islamic financing with constant-dollar agreements is specifically asset-based financing. General Islamic financing with constant-dollar agreements may be backed partially or fully by claims on specific assets of the economic entity and/or a general claim on the assets of the economic entity. Or it may be cash-flow financing, backed by the expected future cash flows of the economic entity. To the extent that the expected cash flows are the product of "soft" assets (assets that cannot be sold upon liquidation of the entity, such as the skills and contacts of the human resources of the enterprise) rather than "hard" assets (assets that can be sold upon liquidation of the enterprise, typically physical assets such as plant, equipment and inventory), cash-flow financing may have little or no asset backing.

As in lease-to-own Islamic compliant financing with a constant-dollar instrument, the users of funds in general Islamic compliant financing including a constant-dollar instrument may also be suppliers of funds. However, in the case of general Islamic compliant financing including a constant-dollar instrument the funds supplied by the users of funds may be employed within the economic entity for general purposes rather than being a down payment on the asset being financed and/or a buy-out of the supplier(s) of funds. In some embodiments, users of funds (individuals who are employed by or are otherwise an operating part of the economic entity) who also supply funds to the economic entity (in general Islamic compliant financing including a constant-dollar instrument) are referred to as internal suppliers of funds. Suppliers of funds that are not employed by or otherwise involved in the operations of the economic entity are referred to as external suppliers of funds.

Although external suppliers of funds are not involved in the operations of the economic entity receiving the general Islamic compliant financing including a constant-dollar instrument, they may provide training, consulting, marketing or other services that may reduce the risk of their investment and increase the economic performance of the economic entity. Combining the provision of services to improve economic performance and reduce risk with supplying funds may be considered a plus for compliance with Islamic law. It also may be one of the factors supporting the success of micro-loan programs as pioneered by the Grameen Bank.

In general Islamic compliant financing including a constant-dollar instrument, external suppliers of funds may acquire preferred equity interests in the partnership vehicle that have a preferred (to common equity interests) claim on the cash flow and assets (and/or sale proceeds in the event of the sale of the partnership vehicle) that is specified in constant dollars (units of purchasing power). If the parties are not subject to Islamic (Shariah) law, some or all of the external suppliers of funds may acquire debt instruments (some or all of which may be constant dollar instruments) issued by the partnership vehicle. Some (or all) of the external suppliers of funds may acquire common equity interests in the partnership vehicle.

Internal suppliers of funds may also acquire preferred equity interests in the partnership vehicle that have a preferred (to common equity interests) claim on the cash flow and assets (and/or sale proceeds in the event of the sale of the partnership vehicle) that is specified in constant dollars (units of purchasing power). Or they may acquire common equity interests in the partnership vehicle or some combination of preferred equity interests and common equity interests. If they choose to acquire preferred equity interests in the partnership vehicle that have a preferred (to common equity interests) claim on the cash flow and assets (and/or sale proceeds in the event of the sale of the partnership vehicle) that is specified in constant dollars (units of purchasing power), they may choose to subordinate the claims of some or all of their preferred equity units to the claims of preferred equity units acquired by external suppliers of funds, which may lower their cost of capital and thus increase their cash flow and/or the value of their holdings.

The user of funds may have the right to fully or partially buy out (subject possibly to limitations, conditions, penalties, rewards, etc.) the preferred equity interest(s) of the supplier (s) of funds during the term of the financing by paying all or some of the constant-dollar buy-out price (which may decline over time, reaching zero with the last constant-dollar financing payment) for the preferred equity interests. The constant-dollar buy-out amounts may be equal to the claim on assets of the partnership vehicle by the supplier(s) of funds, possibly adjusted for pre-payment penalties or rewards. These constant-dollar buy-out amounts, together with the amounts of the constant-dollar claims on the cash flow of the partnership and the purchase price of the preferred equity interests (amount of funds supplied by the supplier of funds) together may define a real return for the supplier of funds. The real return may or not vary as a result of full or partial repayment.

The constant-dollar buy-out amounts for a preferred equity interest may be the amounts of the claim of the preferred equity interest on the assets of the partnership vehicle or the amounts of the claims adjusted by some early buy-out penalty or reward. The constant-dollar buy-out amounts or claims may be considered to be analogous to the constant-dollar principal amounts of constant-dollar debt financing.

There may be more than one level of preferred equity interest in the partnership vehicle and, therefore, more than one risk/return choice offered to suppliers of funds. For example, in general Islamic compliant constant-dollar financing for a business: 1) a senior preferred interest in the partnership entity may be held by a senior supplier of funds who puts up funds in return for a first claim on the cash flow and the assets of the partnership vehicle; and, 2) a junior preferred interest in the partnership entity may be held by a junior supplier of funds who puts up an additional amount of funds for a second claim on the cash flow and the assets of the partnership vehicle. The common equity holders of the partnership vehicle may put up additional funds in return for last claim on the cash flow and assets of the partnership vehicle. The maturities of the senior and junior preferred interests (i.e., the number of payments to full buy-out) may be the same or different. The real return on the junior preferred interest may be higher than the real return on the senior preferred interest in order to provide compensation for the higher level of risk.

The financing agreements for general Islamic compliant financing including a constant-dollar instrument may include, but are not limited to: 1) the amount(s) paid by supplier(s) of funds for preferred equity interests in the partnership vehicle; 2) the net amount(s) received by the user of funds after sales commissions and other financing expenses; 3) the preference levels of different preferred equity interests regarding claims on the cash flow and assets of the partnership vehicle; 4) the constant-dollar payment to be made (number of payments, timing and amounts); 5) the constant-dollar claims of the preferred equity interest(s) on the income and assets of the partnership vehicle; 6) the constant-dollar buy-out amounts for the preferred equity interest or interests; 7) the underlying currency (e.g., U.S. dollars, Mexican pesos, euros, yen, etc.); 8) the index used to adjust the underlying currency for inflation (e.g., the Consumer Price Index for all Urban Consumers); 9) the frequency with which nominal dollar amounts are adjusted for inflation; 10) the initial inflation rate used for the first adjustment period; 11) early buy-out conditions, restrictions, penalties, etc.; 12) finance covenants such as positive covenants requiring the maintenance of certain minimum levels of financial ratios, income and asset levels and negative covenants restricting additional financing and pay-outs to holders of common equity interests in the partnership vehicle; 13) agreements regarding a process for curing defaults, including a process for transfer of control of the partnership entity from the holder(s) of the common equity interests to the holder(s) of the preferred equity interest(s) and/or some form of joint control; and, 14) agreements regarding the use of a computer-aided process to administer and manage the agreements and processes.

All terms and agreements of the financing may be entered into the computer system. All financial and other data relevant to the terms and agreements/covenants may be entered into the computer system as the data become available. If the financing is a new financing, the computer system may check for consistency with the terms and conditions of existing financing. Subsequent to the closing of the financing transaction, the computer system may manage a process for monitoring and enforcing the financing agreements.

Default may occur if any of the financing agreements are broken—e.g., a failure to make the constant-dollar payments in a timely manner as specified in the agreements, a failure to maintain a financial ratio at an agreed-upon level; making pay-outs to holders of common equity interests in excess of specified amounts, etc. In the event of default, the computer-aided process for administering and enforcing the financing agreements may notify the user of funds and the suppliers(s) of funds of the default and the steps in the process for curing the default. The computer-aided process may continue to administer and manage the process until the default is cured.

In the event of default, it may be possible for the user of funds to take action to reduce expenses and/or increase revenues, thus creating the financial resources necessary to cure the default. It may be that the supplier(s) of funds have knowledge and/or resources that can assist the user of funds to cure the default. If the user of funds is a business, the supplier(s) of funds (or agents of the suppliers of funds) may be able to assist the user of funds in improving the efficiency of business operations and/or to budget and better manage resources, thus reducing expenses. The supplier(s) of funds or their agents may be able to assist the business in marketing and/or improving its products and services, thus increasing revenues. Similarly, if the user of funds is an individual or household, the supplier(s) of funds or their agents may be able to teach the user of funds basic budgeting and money management skills that will cure the default—or even assist the user or users of funds in marketing themselves and thus increasing their income.

The computerized process for administering and enforcing the financing agreements may facilitate this cooperative approach in which the supplier(s) of funds or their agents seek to assist the user of funds in curing a default. For example, the computerized process may create and update a database of past defaults, actions taken, and the results of the actions with regard to curing the default. Searching such a database might assist the parties (user and suppliers of funds or their agents) in determining which actions have the highest probability of curing the default. In addition, the computerized process may include a set of computerized tools for educating and training users of funds in methods for controlling and reducing costs and increasing revenues, with the tools being reviewed, evaluated and updated on a regular basis. The computerized process may even act to connect business users of funds with potential customers and to connect individuals who are users of funds with potential employers.

If the user of funds lacks the resources and/or abilities necessary to cure the default or is not willing to take the actions necessary to cure the default, the result may be either a renegotiation of financing terms (e.g., reducing the constant-dollar payments and spreading them over a longer term) or a liquidation of the partnership vehicle. If the user of funds is a business, the operation of the business may be shut down and all assets of the business may be sold. If the user of funds is an individual or household, all of the assets in the partnership vehicle may be sold upon liquidation.

The computer-aided process for administering and enforcing financing agreements may include a process for transferring control of the partnership entity from the user of funds to the supplier(s) of funds—the holders of the constant dollar preferred equity interests. The user of funds may retain a voice in the affairs of the partnership entity after transfer of control to the supplier(s) of funds. Upon assuming control of the partnership entity, the supplier(s) of funds may choose to liquidate the partnership vehicle.

In an embodiment of the computer-aided process for administering and enforcing the agreements governing existing financing (FIGS. 5, 5A, 5B and 5C), all terms and agreements/covenants of all existing financing are entered. Current financial data and all other data relevant to the terms and agreements/covenants are entered. If not already entered, all historical financial and other data relevant to the terms and agreements/covenants of the existing financing are entered. The embodiment determines whether or not any of the terms and agreements/covenants of the existing financing are being violated. If no violations exist, there is output of a status report (or signal), which may be sent to all suppliers of funds or their agents and to the user of funds.

If violations exist, the system determines which holders of constant dollar preferred equity interests are affected by the violation and/or are to be notified according to relevant terms and agreements/covenants. There is output of a signal or a status report, including all relevant financials and other data, which is sent to the user of funds and to all suppliers of funds that are affected and/or require notification of the violations.

The system retrieves data on actions that have been taken to resolve similar violations by similar enterprises in the past and the results of these actions. The system searches for computerized tools that have been effective in resolving similar defaults and outputs the results of its search to the user of funds and the supplier(s) of funds.

An electronic or physical meeting of the user of funds and affected suppliers of funds or their agents is hosted. If the meeting does not reach agreement on a course of action for curing the default, an expert facilitator or conflict resolution expert may be brought into the process. If agreement is still not reached, the process for transferring control of the partnership vehicle may begin. Upon completion of this process for change in control, the suppliers of funds or their agents then decide either to proceed with liquidation of the partnership vehicle or they agree on another method of resolving the default.

If and when a course of action for remedying the default has been decided upon, the terms and agreements/covenants regarding the course of action (which may involve modifications of previous terms and agreements/covenants based on mutual consent) are entered and all parties are notified of the terms and agreements/covenants. The system monitors the actions taken, results of the actions, and whether or not the default has been resolved and the terms and agreements/covenants (as modified, if relevant) are being satisfied. The results are stored in the database for further reference and learning. If the default is resolved within the agreed upon time frame, then the system continues its ongoing monitoring process. If the default is not remedied within the agreed upon time frame, the system begins again the process for curing defaults, beginning with notification of all parties.

In the event that the process results in a decision to liquidate the partnership entity, the system notifies all parties of the liquidation, the expected time table, the expected proceeds, and the amounts that each supplier of funds may expect to receive. The system monitors the liquidation process and may assist in the process. The system distributes the proceeds from the liquidation according to the agreements/covenants governing the instruments.

For a new financing, the terms of the proposed financing, including all agreements/covenants are entered. If not already entered, the terms and agreements of all present financings are entered. It is determined if the terms/agreements of the proposed financing are consistent with/allowed by the agreements/covenants of the existing financing. If the new financing is not consistent with the existing financing, all parties are notified and the terms and agreements of the proposed financing are modified to create consistency with the agreements/covenants of the existing financing or the new financing is aborted. If the proposed financing is consistent, approval of the new financing is outputted and the parties may proceed with the financing effort, and the results of the financing effort are entered into the system.

As regards Islamic compliant financing including a constant dollar instrument and multiple tiers of financing, the term "tier" generally refers to a set of financial instruments. A set of financial instruments is one or more financial instruments. The tier may be fixed (i.e., closed) or ongoing (open-ended).

A fixed, or closed, tier is defined by the fixed set of financial instruments contained in the tier. A fixed tier may be completely fixed or it may allow (or, in some cases, require) some, some part, or all of the instruments in the tier to be replaced by other instruments subject to specified qualifications, requirements, or limitations. A fixed tier may have a finite life time defined by the life of the instruments that it contains and/or the life of an other tier with which the tier is associated.

A possible example of a fixed tier of Islamic compliant financing including a constant-dollar instrument is a set of constant dollar preferred equity interests in partnership vehicles held by a unit investment trust (UIT). The set may include one or more constant dollar preferred equity interests. The constant dollar preferred equity interests may be providing lease-to-own Islamic compliant financing with constant-dollar agreements, general Islamic compliant financing with constant-dollar agreements, or some combination thereof that have been specified in a specifying step in the computer-aided funding process. The specifying may include a step of determining various criteria for the origination or purchase of a constant dollar preferred equity interest, including a real return that is determined using market data that includes a market real interest rate or return.

This is a fixed tier as the specified set of constant dollar preferred equity interests will remain unchanged with the exception of substitutions that may be allowed or required by the agreements governing the operation of the UIT. In a possible example, the agreements governing the UIT may require the entity that organized the UIT (possibly an investment banker, a commercial bank or other financial institution) to replace a constant dollar preferred equity interest that goes into default with one or more constant dollar preferred equity interests that meet certain standards and are not in default. This tier may have a finite life equal to the life of the longest-lived constant dollar preferred equity interest contained in the tier.

In this possible example, a second tier in a plurality of tiers might be a tier of financial instruments that are the liabilities of the UIT. This other tier may include constant dollar pass-through securities (undivided ownership interests in the UIT), constant dollar preferred equity interests in the UIT, a common equity or high-yield piece of the UIT, and/or other financial instruments.

This other tier is associated with the tier comprised of constant dollar preferred equity interests owned by the UIT and this other tier, through this association, funds the one tier comprised of constant dollar preferred equity interests owned by the UIT. This funding of one tier by an other may involve determining, among other things, that: 1) the net sale proceeds of the other tier is sufficient to pay the costs of originating and/or purchasing the constant-dollar preferred equity interests contained in the one tier; 2) the cash flows of the constant-dollar preferred equity interests in the one tier are not less than the cash flows of the financial instruments in the other tier; 3) the real return on the constant-dollar preferred equity interests in the one tier is not less than the real return on the instruments comprising the other tier; 4) the real returns on the instruments comprising the second tier are, when evaluated using market data including a real interest rate or real rate of return, consistent with their required real return given their risk; 5) the splitting (dividing), by maturity and/or priority of claims, of the aggregate cash flows of the constant dollar preferred equity interests comprising the one tier among the instruments among the instruments comprising the other tier provides the lowest real cost of funding the one tier by the other; and, 6) the real return on the common equity or high-yield piece, if any, is consistent with the required return given its risk.

The process of specifying the other tier may involve associating cash flow from the one tier comprising constant dollar preferred equity interests with the other tier. This process of associating may include, in the process of specifying the instruments comprising the other tier, the step of computing aggregate cash flows of the one tier comprising constant dollar preferred equity interests to produce homogenous securities in the other tier. A possible example of this process would be to aggregate the cash flows of the one tier comprising constant dollar preferred equity interests and to divide them equally among a number of constant dollar pass-through securities comprising the other tier. These constant dollar pass-through securities comprising the other tier would be homogeneous because each would represent an undivided interest in the cash flows produced by the constant dollar preferred equity interests comprising the one tier. This homogeneity creates liquidity for the constant dollar pass-through securities, thus enabling the other tier comprised of constant dollar pass-through securities to securitize the one tier comprised on constant dollar preferred equity interests.

Because each constant dollar pass-through security represents an undivided interest in the cash flows produced by the constant dollar preferred equity interests comprising the one tier, each security would be identical in terms of risk and maturity. However, different suppliers of funds (purchasers of the financial instruments comprising the other tier being suppliers of funds) may have different preferences regarding risk and maturity. As a result, it may be possible to reduce the cost of funding the one tier comprised of constant dollar preferred equity interests with the other tier by disaggregating the homogenous securities comprising the other tier, splitting them by claims priorities and/or maturity times.

A possible example of this disaggregating homogeneous securities by splitting (dividing claims on cash flows and assets) would be to specify constant dollar preferred equity interests in the UIT for the other tier. A splitting (dividing) by maturity times might include specifying a maturity schedule for the other tier comprised of constant dollar preferred equity interests. The specifying may include associating a maturity of the constant dollar preferred equity interests in the UIT comprising the other tier with a maturity of the constant dollar preferred equity interests comprising the one tier. A splitting (dividing) by priority of claims might create a number of classes of instruments in the other tier. As a possible example: senior constant dollar preferred equity interests in the UIT with first claim on the payments and principal of the constant dollar preferred equity interests comprising the one tier; subordinated constant dollar preferred equity interests in the UIT with second claim on cash flow and principal; junior subordinated constant dollar preferred equity interests in the UIT with third claim on cash flow and principal; and a common equity or high-yield piece of the UIT with last claim on the cash flow and principal of the constant dollar preferred equity interests comprising the one tier.

The funding of the one tier comprised of constant dollar preferred equity interests by the other tier comprised of constant dollar preferred equity interests in the UIT transforms the liability of a user of funds into an asset of supplier of funds using the tiers. This transformation using the tiers may provide benefits to both suppliers and users of funds by: 1) creating liquidity for suppliers of funds as a result of securitization; 2) providing a variety of real return/risk choices for suppliers of funds; 3) providing a variety of real return/maturity choices for suppliers of funds; and, 4) increasing the availability of funds and reducing their cost for users of funds.

Users of funds who may benefit from the funding created by the association of the tiers may include individuals, households, for-profit businesses, not-for-profit organizations, governments, government agencies, government sponsored enterprises, etc. Suppliers of funds who may benefit from the funding may include, among others: individuals; households; investment companies; mutual funds; pension funds; depository institutions; commercial banks; credit unions, etc. To the extent that the suppliers of funds involved in the funding are financial intermediaries (investment companies; mutual funds; pension funds; depository institutions; commercial banks; credit unions, etc.), the result is to involve one or more tiers intermediate that are not within the portion of the tiers that are associated in the funding. For example, the purchase of some of the constant-dollar preferred equity interests in the UIT by a mutual fund that invests in constant-dollar securities involves in the funding a tier of constant-dollar mutual fund shares intermediate that is not within the portion of the tiers that are associated in the funding.

Documentation of the funding may be generated by a computer, or by more than one computer. The computer system of the UIT, or an other computer system such as the computer system of the entity that formed the UIT (e.g., an investment banker, a commercial bank, a finance company, a credit union, etc.) may generate documentation that may include documentation for one or more private constant-dollar instruments within any of the tiers, documentation regarding the sale, purchase and/or origination of any the instruments, etc. An other computer system may be involved in generating documentation for one or more private constant-dollar instruments in any of the tiers. A possible example is a UIT formed by a finance company with the finance company purchasing some or all of the constant dollar preferred equity interests comprising the one tier from one or more brokers. The documentation for the constant-dollar preferred equity interest may be generated by the brokers from which the finance company purchases the preferred equity interests. The finance company may engage the services of an investment banker to structure the constant dollar preferred equity interests in the UIT comprising the other tier, underwrite the securities and market the securities. The investment banker computer 148 may then generate the documentation for the constant dollar preferred equity interests in the UIT.

Embodiments may include the step of servicing any of the constant-dollar instruments in any of the tiers. The servicing may be performed by one computer or by more than one computer. In the possible example of a UIT formed by a finance company, the servicing of a constant-dollar preferred equity interest in the one tier may be performed by the computer of a commercial bank, the computer of the finance company, or an other computer 156 or computers. The servicing of the constant dollar preferred equity interests in the UIT comprising the other tier may be performed by a servicing computer 136 operated by a commercial bank or a trust company or by an other computer 156 or computers.

It may be that all of the constant dollar preferred equity interests comprising the one tier are in one currency (e.g., U.S. dollars) and that the constant dollar preferred equity interests in the UIT comprising the other tier are in the same currency, determining a funding in only one currency.

It may be that one or more of the constant dollar preferred equity interests comprising the one tier are in a currency or currencies different from the currency or currencies of the constant dollar preferred equity interests in the UIT comprising the other tier. As a possible example, the constant dollar preferred equity interests comprising the one tier may be in Mexican pesos or in a variety of developing country currencies and the constant dollar preferred equity interests in the UIT may be in U.S. dollars (or euros or some combination of developed country currencies). If more than one currency is involved in the funding, the funding may include a step of determining a value of one or more tiers responsive to currency.

Embodiments may include tiers that are ongoing, or open-ended rather than fixed. In an ongoing, or open-ended, tier instruments may be added or removed over time. The size of the tier (as measured by the number of instruments, the principal amount of the instruments, etc.) may grow or shrink over time. There may or may not be restrictions, limitations, requirements, regulations, etc. which may limit, affect or otherwise determine the instruments which may be added or removed from an ongoing tier.

For another possible example of Islamic compliant financing including a constant-dollar instrument involving the association of ongoing tiers, consider an Islamic compliant finance company. The one ongoing tier, comprised of instruments that are assets of the finance company, may (depending on the investment guidelines of the finance company) include, but not be limited to, some combination of:

1. Constant dollar lease-to-own financing not using a partnership vehicle.
2. Preferred equity interests in partnership vehicles used for lease-to-own financing.
3. Preferred equity interests providing general Islamic compliant financing for businesses.
4. Preferred equity interests providing general Islamic compliant financing for individuals.

5. Preferred equity interests providing general Islamic compliant financing for households.
6. Preferred equity interests providing general Islamic compliant financing for not-for-profits.
7. Preferred equity interests providing general Islamic compliant financing for governments.
8. Preferred equity interests providing general Islamic compliant financing for government agencies.
9. Preferred equity interests providing general Islamic compliant financing for government sponsored enterprises.

An other ongoing tier, comprised of instruments that are liabilities of the finance company, is associated with the one ongoing tier in the funding of the one ongoing tier by the other ongoing tier. The other tier may include, but not be limited to, some combination of:

1. Constant-dollar debentures.
2. Constant-dollar subordinated debentures.
3. Constant-dollar capital notes.
4. Constant-dollar asset-backed securities.
5. Constant-dollar income bonds.
6. Constant-dollar preferred stock.

In the process of funding the one ongoing tier with the other ongoing tier, the finance company may: 1) sell constant dollar preferred equity interests in the finance company comprising the other tier and then purchase and/or originate constant-dollar investments comprising the one tier; 2) purchase and/or originate constant-dollar investments comprising the one tier and then sell constant dollar preferred equity interests in the finance company comprising the other tier; 3) simultaneously sell constant dollar preferred equity interests in the finance comprising the other tier and purchase and/or originate constant-dollar investments comprising the one tier; or, 4) practice some combination of the preceding.

In funding an ongoing tier (e.g., tranche) of constant-dollar Islamic instruments by associating it with an other ongoing tier comprised of constant dollar preferred equity interests in the finance company, the computer of the finance company is transforming the liability of a user of funds into an asset of a supplier of funds using the tiers.

Although only a few exemplary embodiments have been described in detail above, those skilled in the art will readily appreciate that many modifications are possible in the exemplary embodiments without materially from the novel teachings and advantages herein. Accordingly, all such modifications are intended to be included within the scope defined by claims. In the claims, means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

We claim:

1. A computer-aided method of illustrating, the method including:
   specifying, to a computer system, a private constant-dollar instrument, including defining a respective claim division on cash flow and on an asset;
   entering data comprising actual cash flow datum and actual asset datum;
   calculating from the data, with the computer system, respective values for each of the claims on the cash flow and the asset; and,
   generating from the respective values, with the computer system, an illustration of the private constant-dollar instrument funding a transaction.

2. The method of claim 1, further including implementing the claim division by associating the claim division with a legal entity.

3. The method of claim 2, wherein the legal entity is a corporation.

4. The method of claim 2, wherein the legal entity is a limited liability company.

5. The method of claim 2, wherein the legal entity is a partnership.

6. The method of claim 2, wherein the legal entity is a limited liability partnership.

7. The method of claim 2, wherein the legal entity is a sole proprietorship.

8. The method of claim 2, wherein the legal entity is a not-for-profit corporation.

9. The method of claim 2, wherein the legal entity is a foundation.

10. The method of claim 2, wherein the legal entity is a co-operative.

11. The method of claim 2, wherein the legal entity is an educational institution.

12. The method of claim 2, wherein the legal entity is a religious organization.

13. The method of claim 2, wherein the legal entity is a government.

14. The method of claim 2, wherein the legal entity is a governmental unit.

15. The method of claim 2, wherein the legal entity is a government agency.

16. The method of claim 2, wherein the legal entity is a government sponsored enterprise.

17. The method of claim 2, wherein the legal entity is an individual.

18. The method of claim 2, wherein the legal entity is a couple.

19. The method of claim 1, wherein the specifying includes specifying a lease-to-own agreement.

20. The method of claim 1 further including converting the private constant-dollar instrument into an equivalent nominal-dollar instrument.

21. The method of claim 1, further including administering financing, associated with the transaction, with the computer system.

22. The method of claim 21, further including monitoring an agreement condition, with the computer system, to detect a default of the condition, the agreement condition corresponding to the private constant-dollar instrument.

23. The method of claim 22, further including, if the default is detected, outputting a signal of the default.

24. The method of claim 23, wherein the administering includes carrying out a default curing routine upon detection by the computer system of the default.

25. The method of claim 24, further including a step of outputting a result of the curing routine.

26. The method of claim 1, further including administering the transaction with the computer system.

27. Apparatus for controlling a computer system, the apparatus comprising:
   a data processing means arranged for receiving data into a memory data defining a private constant-dollar instrument, including defining a respective claim division on cash flow and on an asset, and data including actual cash flow datum and actual asset datum, the data processing means including:

calculating means, responsive to at least some of the data including actual cash flow datum and actual asset datum, for calculating respective values for each of the claim divisions on the cash flow and the asset; and generating means, responsive to the values, for generating documentation for generating an illustration of the private constant-dollar instrument funding a transaction.

28. Apparatus for controlling a computer system, the apparatus including:

a computer system arranged to receive data and locate the data into a memory, the data including data defining a private constant-dollar instrument, including defining a respective claim division on cash flow and on an asset, and data including actual cash flow datum and actual asset datum;

program control means for controlling the computer system in calculating, responsive to at least some of the data including actual cash flow datum and actual asset datum, respective values for each of the claim divisions on the cash flow and the asset to produce output;

generating means for generating the output including values for each of the claim divisions on the cash flow and the asset corresponding to the private constant-dollar instrument.

29. An electronic transmission apparatus for handling communications to implement a private constant-dollar investment, the apparatus including:

program control means governing a first computer in communication with a second computer, the first computer and the second computer cooperating so as to implement a private constant-dollar investment, wherein at least one of the computers is arranged for receiving data into a memory, the data defining a private constant-dollar instrument, including defining a respective claim division on cash flow and on an asset, and data including actual cash flow datum and actual asset datum, and for calculating from the data including actual cash flow datum and actual asset datum respective values for each of the claim divisions on the cash flow and the asset, and wherein at least one of the computers is arranged for generating custom documentation implementing the private constant-dollar instrument; and electronic transmission means for communicating between the computers so as to enable the computers to cooperate in carrying out the implementing.

30. The apparatus of claim 29, further including a network enabling the computers to communicate.

31. An electronic transmission apparatus for handling communications to implement a private constant-dollar investment, the apparatus including:

program control means governing a first computer in communication with a second computer, the first computer receiving communication from the second computer so as to implement a private constant-dollar investment, wherein at least one of the computers is arranged for receiving data into a memory, the data defining a private constant-dollar instrument, including defining a respective claim division on cash flow and on an asset, and data including actual cash flow datum and actual asset datum, and for calculating from the data including actual cash flow datum and actual asset datum respective values for each of the claim divisions on the cash flow and the asset, and wherein at least one of the computers is arranged for generating custom documentation implementing the private constant-dollar instrument; and electronic receiver means for enabling the receiving of the communication so as to enable the implementing.

32. The apparatus of claim 31, further including an Internet network enabling the receiving.

33. A non-transitory computer-readable media embodying a program of instructions executable by a computer to perform the steps of:

receiving definition of a private constant-dollar instrument, the definition including a respective claim division on cash flow and on an asset;

receiving data including actual cash flow datum and actual asset datum;

calculating from the data respective values for each of the claims on the cash flow and the asset; and generating output including the respective values for each of the claim divisions on the cash flow and the asset.

34. The media of claim 33, wherein the media comprises at least one of a RAM, a ROM, a disk, an ASIC, and a PROM.

35. A non-transitory computer-readable media embodying a program of instructions executable by a computer system to perform the operations of:

receiving definition of a private constant-dollar instrument, the definition including a respective claim division on cash flow and on an asset;

receiving data including actual cash flow datum and actual asset datum;

calculating from the data respective values for each of the claims on the cash flow and the asset; and generating output including the respective values for each of the claim divisions on the cash flow and the asset.

36. The computer-readable media of claim 35, wherein the media comprises at least one of a RAM, a ROM, A disk, an ASIC, and a PROM.

* * * * *